(12) United States Patent
Ito et al.

(10) Patent No.: US 8,121,002 B2
(45) Date of Patent: Feb. 21, 2012

(54) MULTI-LAYERED INFORMATION RECORDING MEDIUM, RECORDING APPARATUS, AND RECORDING METHOD

(75) Inventors: Motoshi Ito, Osaka (JP); Takashi Ishida, Kyoto (JP); Hiroshi Ueda, Nara (JP); Yoshikazu Yamamoto, Osaka (JP); Mamoru Shoji, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/980,413

(22) Filed: Dec. 29, 2010

(65) Prior Publication Data

US 2011/0090771 A1    Apr. 21, 2011

Related U.S. Application Data

(63) Continuation of application No. 12/648,384, filed on Dec. 29, 2009, now Pat. No. 7,889,610, which is a continuation of application No. 12/120,307, filed on May 14, 2008, now Pat. No. 7,663,992, which is a continuation of application No. 11/566,717, filed on Dec. 5, 2006, now Pat. No. 7,715,291, which is a continuation of application No. 10/338,430, filed on Jan. 8, 2003, now Pat. No. 7,184,377.

(30) Foreign Application Priority Data

Jan. 22, 2002    (JP) .................................. 2002-013492

(51) Int. Cl.
*G11B 7/00*    (2006.01)
(52) U.S. Cl. ...................... 369/47.14; 369/275.3; 369/94
(58) Field of Classification Search ............... 369/47.14, 369/94, 275.3
See application file for complete search history.

(56) References Cited

U.S. PATENT DOCUMENTS

| | | | |
|---|---|---|---|
| 5,202,875 A | 4/1993 | Rosen et al. | |
| 5,241,531 A | 8/1993 | Ohno et al. | |
| 5,271,018 A | 12/1993 | Chan | |
| 5,404,357 A | 4/1995 | Ito et al. | |

(Continued)

FOREIGN PATENT DOCUMENTS

CN    1130953 A    9/1996

(Continued)

OTHER PUBLICATIONS

European Search Report regarding Application No. 03000073.1 dated Oct. 1, 2003.

(Continued)

*Primary Examiner* — Adam R Giesy
(74) *Attorney, Agent, or Firm* — Renner, Otto, Boisselle & Sklar, LLP

(57) ABSTRACT

A multi-layered information recording medium including a plurality of recording layers, the multi-layered information recording medium comprising: a user data area for recording user data; and a plurality of spare areas including at least one replacement region, wherein when the user data area includes at least one defect region, the at least one replacement region may be used in place of the at least one defect region, wherein a first spare area of the plurality of spare areas is positioned so as to be contiguous to a first user data area of a first recording layer, a second spare area of the plurality of spare areas is positioned so as to be contiguous to a second user data area of a second recording layer, and the first spare area and the second spare area are positioned approximately at the same radial position on the multi-layered information recording medium.

3 Claims, 25 Drawing Sheets

U.S. PATENT DOCUMENTS

| | | | |
|---|---|---|---|
| 5,406,534 | A | 4/1995 | Hisakado et al. |
| 5,737,289 | A | 4/1998 | Udagawa |
| 5,878,020 | A | 3/1999 | Takahashi |
| 5,881,032 | A | 3/1999 | Ito et al. |
| 5,974,025 | A | 10/1999 | Yamada et al. |
| 6,373,800 | B1 | 4/2002 | Takahashi |
| 6,424,614 | B1 | 7/2002 | Kawamura et al. |
| 6,453,384 | B1 | 9/2002 | Park et al. |
| 6,466,532 | B1 | 10/2002 | Ko |
| 6,581,167 | B1 | 6/2003 | Gotoh et al. |
| 6,606,285 | B1 | 8/2003 | Pope et al. |
| 6,683,835 | B2 | 1/2004 | Ko et al. |
| 6,795,381 | B2 | 9/2004 | Ando et al. |
| 6,813,107 | B1 | 11/2004 | Lee |
| 6,845,071 | B2 | 1/2005 | Shoji et al. |
| 6,920,103 | B2 | 7/2005 | Park |
| 7,184,377 | B2 | 2/2007 | Ito et al. |
| 7,663,992 | B2 | 2/2010 | Ito et al. |
| 7,715,291 | B2 | 5/2010 | Ito et al. |
| 2001/0007546 | A1 | 7/2001 | Jo et al. |
| 2001/0020261 | A1 | 9/2001 | Ando et al. |
| 2002/0064110 | A1 | 5/2002 | Sato |
| 2002/0098806 | A1 | 7/2002 | Park |
| 2002/0126602 | A1 | 9/2002 | Woudenberg |
| 2002/0136122 | A1 | 9/2002 | Nakano |
| 2002/0150013 | A1 | 10/2002 | Hsiao |
| 2002/0176346 | A1 | 11/2002 | Park et al. |
| 2002/0191499 | A1 | 12/2002 | Ando et al. |

FOREIGN PATENT DOCUMENTS

| | | |
|---|---|---|
| CN | 1135632 | 11/1996 |
| EP | 0 724 256 | 1/1996 |
| EP | 0 751 509 | 6/1996 |
| EP | 0 840 295 | 10/1997 |
| EP | 0 952 573 A2 | 10/1999 |
| EP | 1 014 365 A2 | 6/2000 |
| EP | 1 026 681 A1 | 8/2000 |
| EP | 1 041 561 A2 | 10/2000 |
| EP | 1 056 089 | 11/2000 |
| EP | 1 132 914 A2 | 9/2001 |
| EP | 1 152 414 A2 | 11/2001 |
| EP | 1 195 749 A2 | 4/2002 |
| EP | 1 260 981 A2 | 11/2002 |
| EP | 1 329 880 A2 | 7/2003 |
| EP | 1 329 888 | 7/2003 |
| JP | 2991228 | 10/1999 |
| JP | 2000-067511 | 3/2000 |
| JP | 2000-149449 | 5/2000 |
| JP | 2000-285607 | 10/2000 |
| JP | 2000-311346 | 11/2000 |
| JP | 2001-014808 | 1/2001 |
| JP | 2003-323769 | 11/2003 |
| WO | 96/27882 | 9/1996 |
| WO | 01/22416 A1 | 3/2001 |
| WO | 02/056307 | 7/2002 |

OTHER PUBLICATIONS

European Search Report regarding Application No. 06006485.4 dated Jun. 16, 2006.

European Search Report regarding Application No. 05018444.9 dated Nov. 16, 2006.

Chinese Office Action for corresponding Application No. 03805681.X dated Feb. 9, 2007 (English translation).

Official Communication for corresponding European Application No. 05018444.9 dated Sep. 26, 2007.

Japanese Office Action for corresponding Application No. 2002-382186 dated Oct. 23, 2007 (including English Translation).

Korean Office Action for corresponding Application No. 10-2004-7011384 dated Mar. 11, 2009 (including English Translation).

European Office Action for corresponding Application No. 09152825.7 dated Jun. 2, 2009.

Sibling Continuation U.S. Appl. No. 12/648,384 filed Dec. 29, 2009 (most recent claims provided).

Indian Office Action for corresponding Indian Application No. 2211/DELN/2004 dated Jun. 29, 2010.

Chinese Office Action for corresponding Chinese Application No. 200810092722.9 dated Aug. 31, 2010 (with English Translation).

European Search Report for corresponding European Application No. EP 10 15 5553 dated Oct. 14, 2010.

European Search Report for corresponding European Application No. EP 10 15 5656 dated Oct. 13, 2010.

Second recording layer 42

First recording layer 41

Second recording layer 42
First recording layer 41

Reproduction direction

FIG. 4A
*CONVENTIONAL ART*
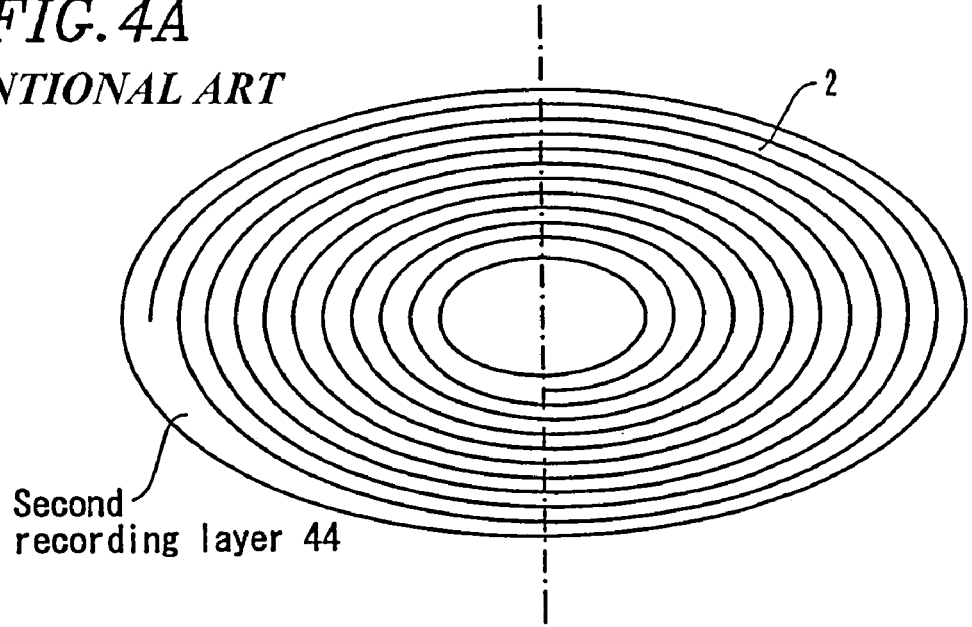
Second recording layer 44
FIG. 4B  *CONVENTIONAL ART*
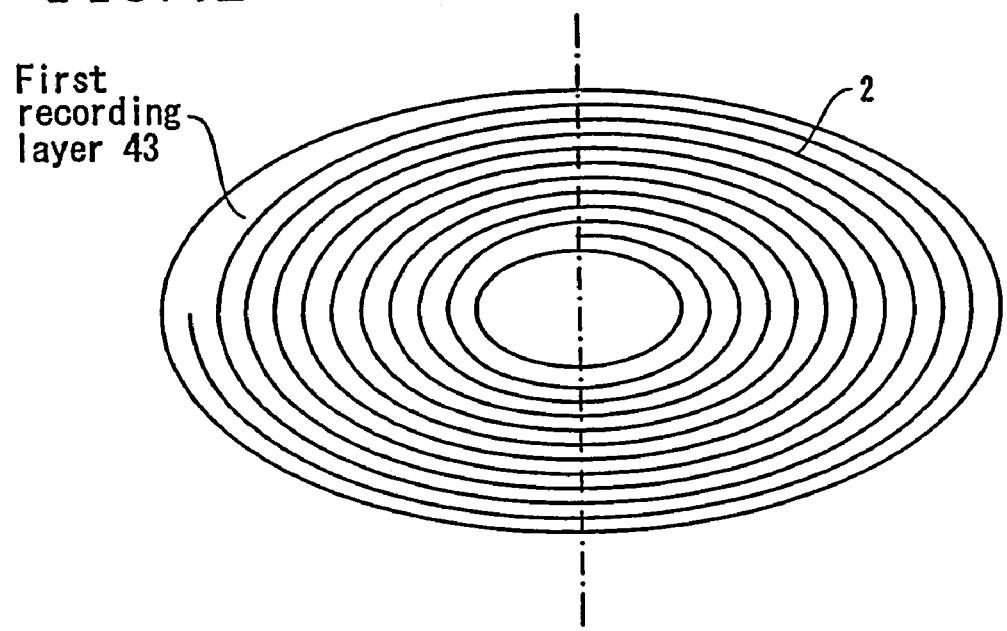
First recording layer 43

Second recording layer 44
First recording layer 43

CONVENTIONAL ART

Reproduction direction

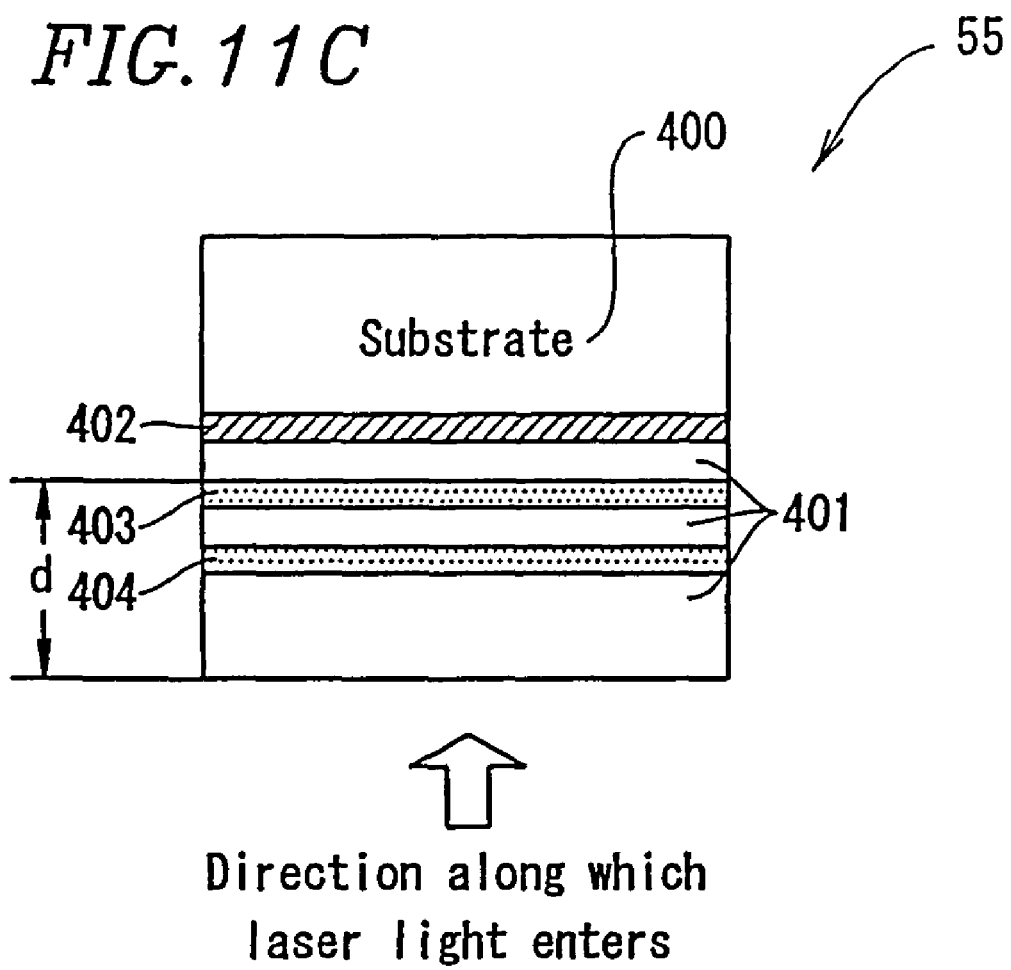

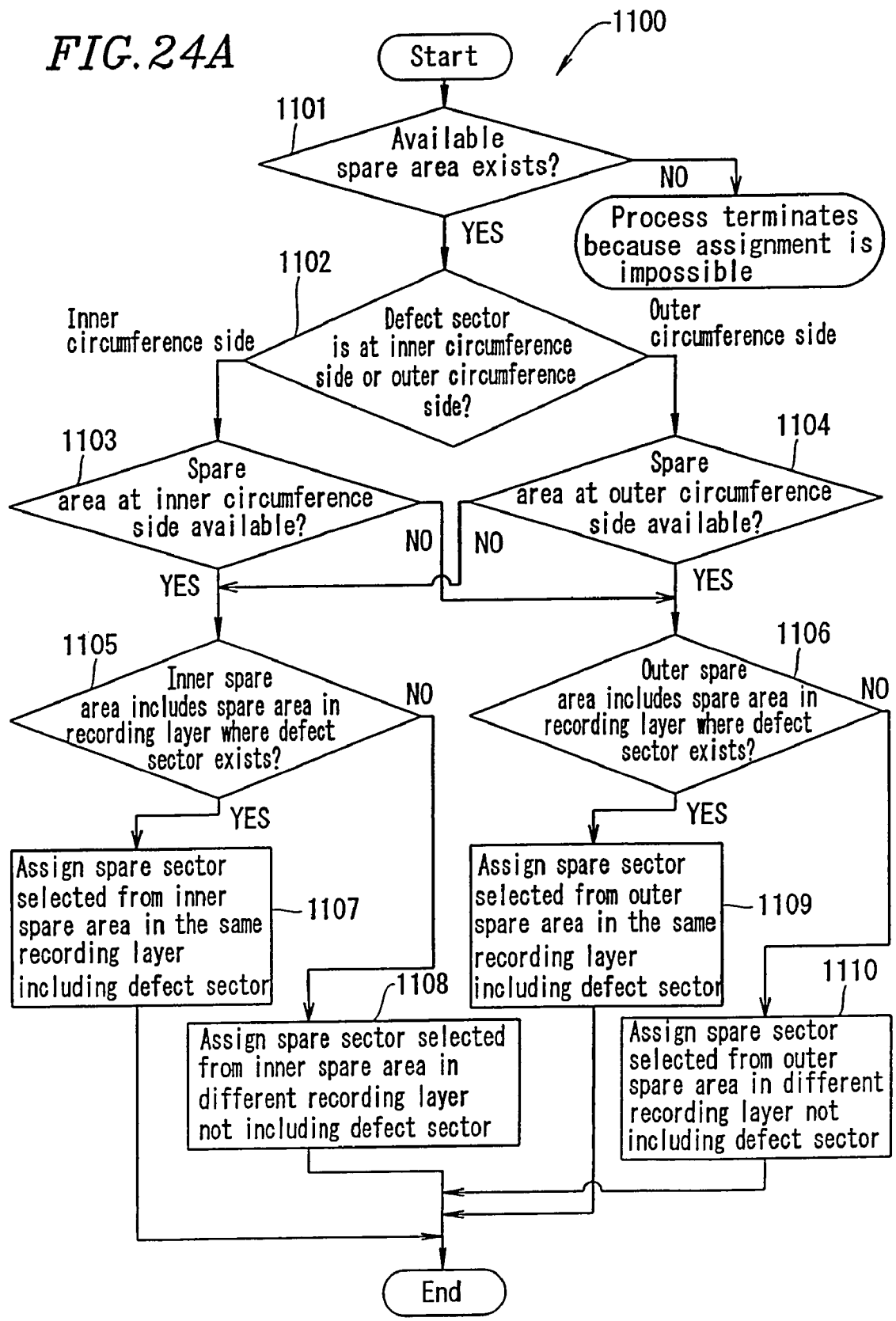

MULTI-LAYERED INFORMATION RECORDING MEDIUM, RECORDING APPARATUS, AND RECORDING METHOD

This application is a continuation application of U.S. patent application Ser. No. 12/648,384 filed Dec. 29, 2009 now U.S. Pat. No. 7,889,610, which is a continuation of U.S. application Ser. No. 12/120,307 filed on May 14, 2008, now U.S. Pat. No. 7,663,992, which is a continuation of U.S. application Ser. No. 11/566,717 filed Dec. 5, 2006, now U.S. Pat. No. 7,715,291, which is a continuation of U.S. application Ser. No. 10/338,430 filed Jan. 8, 2003, now U.S. Pat. No. 7,184,377, the entire disclosures of which are incorporated herein by reference, and is related to sibling U.S. application Ser. Nos. 12/120,334, 12/120,323, 12/120,343 and 12/120,348 all filed on May 14, 2008, now abandoned.

BACKGROUND OF THE INVENTION

1. Field of the Invention

The present invention relates to a multi-layered information recording medium including at least two recording layers, a recording apparatus for use with the multi-layered information recording medium, and a recording method for recording information in the multi-layered information recording medium.

2. Description of the Related Art

A typical information recording medium which has a sector structure is an optical disc. In recent years, AV data, such as audio data, video data, and the like, has been digitalized, and accordingly, an optical disc having a higher recording density and larger capacity has been demanded. Providing a plurality of recording layers is useful in increasing the capacity of a disc. For example, the capacity of a read-only DVD has been increased about two times by providing two recording layers to the DVD.

FIG. 1 shows a structure of a typical optical disc medium 1 including a track 2 and sectors 3. The optical disc medium 1 includes a track 2 turned multiple times in a spiral arrangement. The track 2 is divided into a large number of small sectors 3. Regions formed on the disc medium 1 are roughly classified into a lead-in zone 4, a user data area 8 and a lead-out zone 6. Recording or reproduction of user data is performed on the user data area 8. The lead-in zone 4 and the lead-out zone 6 are provided as margins such that an optical head (not shown) can appropriately follow a track even if overrunning of the optical head occurs when the optical head accesses an end portion of the user data area 8. The lead-in zone 4 includes a disc information zone which stores parameters necessary for accessing the disc medium 1. Physical sector numbers (hereinafter, abbreviated as "PSN(s)") are assigned to the sectors 3 in order to identify the respective sectors 3. Further, consecutive logical sector numbers (hereinafter, abbreviated as "LSN(s)") which start with zero are assigned to the sectors 3 such that a superior apparatus (not shown) such as a host computer identifies the respective sectors 3.

FIG. 2 illustrates a principle of reproduction of data from a read-only optical disc 30 having two recording layers. Herein, production of the read-only optical disc 30 of FIG. 2 is briefly described. In the first place, grooves are formed on substrates 31 and 32 so as to form spiral tracks. Over the grooved surfaces of the substrates 31 and 32, recording layers 33 and 34 are attached so as to cover the grooved surfaces. The substrates 31 and 32 are combined so as to sandwich transparent light-curable resin 35 between the recording layers 33 and 34, thereby obtaining a single read-only optical disc 30.

In this specification, for convenience of description, in FIG. 2, a recording layer 34 closer to the incoming laser light 38 is referred to as a first recording layer 34; whereas the other recording layer 33 is referred to as a second recording layer 33. The thickness and composition of the first recording layer 34 are calibrated such that the first recording layer 34 reflects a half of the incoming laser light 38 and transmits the other half of the incoming laser light 38. The thickness and composition of the second recording layer 33 are calibrated such that the second recording layer 33 reflects all of the incoming laser light 38. An objective lens 37 for gathering the laser light 38 is moved toward or away from the optical disc 30 such that the convergence point (beam spot) 36 of the laser light 38 is placed on the first recording layer 34 or the second recording layer 33.

FIGS. 3A, 3B, 3C and 3D show tracks of two recording layers 41 and 42 of a read-only DVD, which are called parallel paths, and the reproduction direction and sector numbers. FIG. 3A shows a spiral groove pattern of the second recording layer 42. FIG. 3B shows a spiral groove pattern of the first recording layer 41. FIG. 3C shows the reproduction direction in user data areas 8 provided on the recording layers 41 and 42. FIG. 3D shows sector numbers assigned to the recording layers 41 and 42.

Now, consider the read-only DVD disc is rotated clockwise when it is viewed from the back face side of the disc in the direction along which laser light comes onto the disc, i.e., when it is viewed from the back side of the sheets of FIGS. 3A and 3B. In this case, the laser light moves along the track 2 from the inner circumference side to the outer circumference side of the recording layers 41 and 42. In the case where user data is sequentially reproduced along the reproduction direction shown in FIG. 3C, reproduction is first performed from the innermost circumference position to the outermost circumference position of the user data area 8 of the first recording layer 41. Then, reproduction is performed from the innermost circumference position to the outermost circumference position of the user data area 8 of the second recording layer 42. The user data areas 8 of the first and second recording layers 41 and 42 are sandwiched by the lead-in zone 4 and the lead-out zone 6 such that an optical head can appropriately follow the track 2 even if overrunning of the optical head occurs. As shown in FIG. 3D, the PSNs and LSNs of each of the recording layers 41 and 42 are incrementally assigned along the reproduction direction. The PSNs do not necessarily need to start with zero in view of convenience of disc formation. Further, the PSNs do not necessarily need to be continuously assigned between the first and second recording layers 41 and 42 (for example, a value corresponding to the layer number may be provided at the first position of each sector number). As LSNs, consecutive numbers which start with zero are assigned to all of the user data areas 8 included in the optical disc. That is, in the user data area 8 of the first recording layer 41, the LSN at the innermost circumference position is zero, and incrementally increases toward the outermost circumference. The LSN at the innermost circumference position of the user data area 8 of the second recording layer 42 is a number obtained by adding 1 to the maximum LSN of the first recording layer 41. The LSN of the second recording layer 42 also increases in an incremental manner toward the outermost circumference.

FIGS. 4A, 4B, 4C and 4D show tracks of two recording layers 43 and 44 of a read-only DVD, which is called an opposite path arrangement, and the reproduction direction and sector numbers. FIG. 4A shows a spiral groove pattern of the second recording layer 44. FIG. 4B shows a spiral groove pattern of the first recording layer 43. FIG. 4C shows the reproduction direction in user data areas 8 provided on the recording layers 43 and 44. FIG. 4D shows sector numbers assigned to the recording layers 43 and 44.

Now, consider the read-only DVD disc is rotated clockwise when it is viewed from the back face side of the disc in the direction along which laser light comes onto the disc, i.e., when it is viewed from the back side of the sheets of FIGS. 4A and 4B. In this case, the laser light moves along the track 2 from the inner circumference side to the outer circumference side in the first recording layer 43, but from the outer circumference side to the inner circumference side in the second recording layer 44. In the case where user data is sequentially reproduced along the reproduction direction shown in FIG. 4C, reproduction is first performed from the innermost circumference position to the outermost circumference position of the user data area 8 of the first recording layer 43. Then, reproduction is performed from the outermost circumference position to the innermost circumference position of the user data area 8 of the second recording layer 44. The user data area 8 of the first recording layer 43 is sandwiched by the lead-in zone 4 and a middle zone 7 such that an optical head can appropriately follow the track 2 even if overrunning of the optical head occurs. The user data area 8 of the second recording layer 44 is sandwiched by the middle zone 7 and the lead-out zone 6. The function of the middle zone 7 is the same as that of the lead-out zone 6. As shown in FIG. 4D, the PSNs and LSNs of each of the recording layers 43 and 44 are incrementally assigned along the reproduction direction as in the above-described parallel paths, except that the relationship between the sector numbers and the radial direction because the spiral direction of the track 2 of the second recording layer 44 is inverse to the spiral direction of the track 2 of the first recording layer 43. In the user data area 8 of the first recording layer 43, the LSN is zero at the innermost circumference position, and increases incrementally toward the outer circumference side. The LSN at the outermost circumference position in the user data area 8 of the second recording layer 44 is a number obtained by adding 1 to the maximum LSN in the user data area 8 of the first recording layer 43, and increases in an incremental manner toward the innermost circumference.

Above, read-only optical discs have been described. Now, features specific to a rewritable optical disc are described. Such features result from the fact that requirements on a margin for a recording operation are more severe than that for a reproduction operation.

FIG. 5 shows a region layout of the recording layer 45 included in a DVD-RAM which is a rewritable DVD disc. The DVD-RAM has only one recording layer (i.e., recording layer 45). As shown in FIG. 5, the lead-in zone 4 of the recording layer 45 includes a disc information zone 10, an OPC (Optimum Power Calibration) region 11, and a defect management region 12. The lead-out zone 6 includes another defect management region 12. Spare areas 13 are provided between the lead-in region 4 and the user data area 8, and between the user data area 8 and the lead-out zone 6, respectively.

The disc information zone 10 stores disc information regarding parameters necessary for recording/reproduction of data of the optical disc or data format of the optical disc. The disc information zone 10 is also included in a read-only optical disc, but the disc information zone 10 of the read-only optical disc includes nothing important other than a format identifier used for identifying the optical disc. On the other hand, in a rewritable optical disc, specific recommended values for the characteristics of the laser light used for recording, such as the laser power, pulse width, and the like, are stored for each generated mark width. The disc information zone 10 is a read-only region in which information is typically written in at the time of production of the disc. In a DVD-RAM, pits are formed in the disc surface as in a DVD-ROM. (There is a recording principle different from such a "pit" recording principle. For example, in a CD-RW, information is superposed on a meander region (called a "wobble" region) of a groove.)

The OPC region 11 is provided for optimally calibrating the recording power of laser light. A disc manufacturer stores recommended laser parameters for a recording operation in the disc information zone 10. However, a laser element used by the disc manufacturer for obtaining the recommended values is different from a laser element incorporated in an optical disc drive apparatus, in respect to laser characteristics, such as the wavelength, the rising time of the laser power, and the like. Further, even a laser element of the same optical disc drive, the laser characteristics thereof vary because of a variation of the ambient temperature or deterioration which occurs over time. Thus, in an actual case, test recording is performed on the OPC region 11 while increasingly and decreasingly changing the laser parameters stored in the disc information zone 10, such as the power value and the like, so as to obtain an optimum recording power.

The defect management region 12 and the spare areas 13 are provided for defect management i.e., provided for replacing a sector of the user data area 8 in which recording/reproduction cannot be appropriately performed (referred to as a "defect sector") with another well-conditioned (i.e., sufficiently usable) sector. In a rewritable single-layer optical disc, such as a 90 mm magneto-optical disc defined in the ISO/IEC 10090 specifications, or the like, defect management is generally performed.

The spare areas 13 include a sector prepared as a replacement for a defect sector (referred to as a spare sector). A sector which was employed in place of a defect sector is referred to as a replacement sector. In a DVD-RAM, the spare areas 13 are placed at two positions, such that one is at the inner circumference side and the other is at the outer circumference side. The size of the spare area 13 at the outer circumference side is extendable such that an increase of defect sectors which goes beyond expectation can be handled.

The defect management region 12 includes: a disc definition structure (DDS) 20 having a format designed for defect management, which includes the size of the spare area 13 and the position where the spare area 13 is placed; and a defect list (DL) 21 which lists the positions of defect sectors and the positions of replacement sectors. In view of robustness, many discs are designed based on a specification such that each of the inner circumference portion and outer circumference portion of a disc has one defect management region 12, and each defect management region 12 duplicatively stores the same content, i.e., the defect management regions 12 of the disc have the four same contents in total. Alternatively, according to the specification for a 650 MB phase change optical disc (PD), a spare area is provided in the defect management region 12, and when a sector storing a DL 21 changes into a defect sector, the DL 21 is stored in a sector of the spare area.

The above structure is provided for a system including an optical disc drive in order to achieve data reliability on the same level as that of a read-only optical disc in a rewritable optical disc under a condition that margins for physical characteristics are severe in a recording operation rather than a reproduction operation.

Although there are read-only information recording mediums having a plurality of recording layers, all existing rewritable information recording medium have only a single recording layer. The above-described defect management for a rewritable information recording medium is directed to management of only one recording layer. There is no document which discloses defect management in an information recording medium having a plurality of recording layers. If defect management is performed independently in each recording layer, a defect sector in a certain recording layer may not be replaced even when there is no more spare area in the certain recording layer but another recording layer still has an available spare area. Further, in the case where tracks of a disc is arranged in an opposite path arrangement (see FIGS. 4A through 4D), if a spare area is assigned arbitrarily in each recording layer, the radial position of the first recording layer and the radial position of the second recording layer deviate from each other at a transition position where laser light transits from the first recording layer to the second recording layer. In such a case, the access speed decreases.

SUMMARY OF THE INVENTION

According to one aspect of the present invention, there is provided a multi-layered information recording medium including a plurality of recording layers, the multi-layered information recording medium comprising: a user data area for recording user data; and a plurality of spare areas including at least one replacement region, wherein when the user data area includes at least one defect region, the at least one replacement region may be used in place of the at least one defect region, wherein the plurality of recording layers include a first recording layer and a second recording layer positioned contiguous to each other, the first recording layer includes a first user data area which is a portion of the user data area, and a first spare area which is one of the plurality of spare areas, the second recording layer includes a second user data area which is another portion of the user data area, and a second spare area which is another one of the plurality of spare areas, the first spare area is positioned so as to be contiguous to the first user data area, the second spare area is positioned so as to be contiguous to the second user data area, and the first spare area and the second spare area are positioned approximately at the same radial position on the multi-layered information recording medium.

In one embodiment of the present invention, logical addresses are assigned to the first user data area along a circumference direction from an inner circumference side to an outer circumference side of the multi-layered information recording medium; logical addresses are assigned to the second user data area along a circumference direction from the outer circumference side to the inner circumference side of the multi-layered information recording medium; the logical addresses assigned to the first user data area and the logical addresses assigned to the second user data area are in series; the first spare area is positioned so as to be contiguous to a sector to which a maximum logical address is assigned among a plurality of sectors included in the first user data area; and the second spare area is positioned so as to be contiguous to a sector to which a minimum logical address is assigned among a plurality of sectors included in the second user data area.

According to another aspect of the present invention, there is provided a multi-layered information recording medium including a plurality of recording layers, the multi-layered information recording medium includes: a user data area for recording user data; and a plurality of OPC regions provided for calibrating a recording power of laser light, wherein each of the plurality of recording layers includes a corresponding one of the plurality of OPC regions.

In one embodiment of the present invention, the multi-layered information recording medium further comprises a calibration result storage region for storing a result of calibration of the recording power of the laser light, wherein the calibration result storage region is provided in at least a reference layer selected from the plurality of recording layers.

In another embodiment of the present invention, the plurality of recording layers include a first recording layer and a second recording layer positioned contiguous to each other; the first recording layer includes a first user data area which is a portion of the user data area; the second recording layer includes a second user data area which is another portion of the user data area; logical addresses are assigned to the first user data area along a circumference direction from an inner circumference side to an outer circumference side of the multi-layered information recording medium; and logical addresses are assigned to the second user data area along a circumference direction from the outer circumference side to the inner circumference side of the multi-layered information recording medium.

In still another embodiment of the present invention, the plurality of recording layers include a first recording layer and a second recording layer positioned contiguous to each other; the first recording layer includes a first user data area which is a portion of the user data area; the second recording layer includes a second user data area which is another portion of the user data area; logical addresses are assigned to the first user data area along a circumference direction from an inner circumference side to an outer circumference side of the multi-layered information recording medium; and logical addresses are assigned to the second user data area along a circumference direction from the inner circumference side to the outer circumference side of the multi-layered information recording medium.

According to still another aspect of the present invention, there is provided a multi-layered information recording medium including a plurality of recording layers, the multi-layered information recording medium comprising: a user data area for recording user data; and at least one spare area including at least one replacement region, wherein when the user data area includes at least one defect region, the at least one replacement region may be used in replacement of the at least one defect region, wherein the user data area includes a plurality of sectors, a logical address is assigned to each of the plurality of sectors, and one of the at least one spare area is positioned so as to be contiguous to a sector to which a maximum logical address is assigned among the plurality of sectors included in the user data area, and said spare area is expandable.

In one embodiment of the present invention, the spare area positioned contiguous to the sector to which the maximum logical address is assigned is expandable in a direction from the spare area toward the user data area.

In another embodiment of the present invention, the plurality of recording layers include a first recording layer and a second recording layer positioned contiguous to each other; the first recording layer includes a first user data area which is a portion of the user data area; the second recording layer includes a second user data area which is another portion of the user data area; logical addresses are assigned to the first user data area along a circumference direction from an inner circumference side to an outer circumference side of the multi-layered information recording medium; and logical addresses are assigned to the second user data area along a circumference direction from the outer circumference side to the inner circumference side of the multi-layered information recording medium.

In still another embodiment of the present invention, the plurality of recording layers include a first recording layer and a second recording layer positioned contiguous to each other; the first recording layer includes a first user data area which is a portion of the user data area; the second recording layer includes a second user data area which is another portion of the user data area; logical addresses are assigned to the first user data area along a circumference direction from an inner circumference side to an outer circumference side of the multi-layered information recording medium; and logical addresses are assigned to the second user data area along a circumference direction from the inner circumference side to the outer circumference side of the multi-layered information recording medium.

According to still another aspect of the present invention, there is provided a recording apparatus for recording information in a multi-layered information recording medium including a plurality of recording layers, wherein: the multi-layered information recording medium includes a user data area for recording user data, and a plurality of spare areas including at least one replacement region, wherein when the user data area includes at least one defect region, the at least one replacement region may be used in place of the at least one defect region, wherein the plurality of spare areas are provided in at least two recording layers of the plurality of recording layers; the recording apparatus includes an optical head section capable of optically writing the information in the multi-layered information recording medium from one surface of the multi-layered information recording medium, and a control section for controlling execution of a defect management process using the optical head section; and the defect management process includes steps of finding at least one available spare area among the plurality of spare areas, determining whether or not the user data area includes a defect region, if it is determined that the user data area includes a defect region, selecting a spare area whose distance from the defect region is shortest among the at least one spare area found, and replacing the defect region with a replacement region included in the selected spare area.

According to still another aspect of the present invention, there is provided a recording apparatus for recording information in a multi-layered information recording medium including a plurality of recording layers, wherein: the multi-layered information recording medium includes a user data area for recording user data, and a plurality of spare areas including at least one replacement region, wherein when the user data area includes at least one defect region, the at least one replacement region may be used in place of the at least one defect region, wherein the plurality of spare areas are provided in at least two recording layers of the plurality of recording layers, and each of the plurality of recording layers includes a portion of the user data area; the recording apparatus includes an optical head section capable of optically writing the information in the multi-layered information recording medium from one surface of the multi-layered information recording medium, and a control section for controlling execution of a defect management process using the optical head section; and the defect management process includes steps of finding at least one available spare area among the plurality of spare areas, determining whether or not the user data area includes a defect region, if it is determined that the user data area includes a defect region, determining whether or not a recording layer, in which an area including the defect region which is a portion of the user data area exists, includes at least one of the at least one spare area found, if it is determined that the recording layer, in which the area including the defect region exists, includes none of the at least one spare area found, selecting a spare area whose distance from the defect region is shortest among the at least one spare area found, and replacing the defect region with a replacement region included in the selected spare area.

According to still another aspect of the present invention, there is provided a recording method for recording information in a multi-layered information recording medium including a plurality of recording layers, wherein: the multi-layered information recording medium includes a user data area for recording user data, and a plurality of spare areas including at least one replacement region, wherein when the user data area includes at least one defect region, the at least one replacement region may be used in place of the at least one defect region, wherein the plurality of spare areas are provided in at least two recording layers of the plurality of recording layers; and the recording method includes steps of finding at least one available spare area among the plurality of spare areas, determining whether or not the user data area includes a defect region, if it is determined that the user data area includes a defect region, selecting a spare area whose distance from the defect region is shortest among the at least one spare area found, and replacing the defect region with a replacement region included in the selected spare area.

According to still another aspect of the present invention, there is provided a recording method for recording information in a multi-layered information recording medium including a plurality of recording layers, wherein: the multi-layered information recording medium includes a user data area for recording user data, and a plurality of spare areas including at least one replacement region, wherein when the user data area includes at least one defect region, the at least one replacement region may be used in place of the at least one defect region, wherein the plurality of spare areas are provided in at least two recording layers of the plurality of recording layers, and each of the plurality of recording layers includes a portion of the user data area; and the recording method includes steps of finding at least one available spare area among the plurality of spare areas, determining whether or not the user data area includes a defect region, if it is determined that the user data area includes a defect region, determining whether or not a recording layer, in which an area including the defect region which is a portion of the user data area exists, includes at least one of the at least one spare area found, if it is determined that the recording layer, in which the area including the defect region exists, includes none of the at least one spare area found, selecting a spare area whose distance from the defect region is shortest among the at least one spare area found, and replacing the defect region with a replacement region included in the selected spare area.

Thus, the invention described herein makes possible the advantages of providing: (1) a multi-layered information recording medium wherein placement of spare areas in a plurality of recording layers is designed such that the spare areas are used efficiently and access characteristics are improved; and (2) an information recording method, an information reproduction method, an information recording apparatus and an information reproduction apparatus for use with the above multi-layered information recording medium.

These and other advantages of the present invention will become apparent to those skilled in the art upon reading and understanding the following detailed description with reference to the accompanying figures.

BRIEF DESCRIPTION OF THE DRAWINGS

FIG. 4A shows a groove pattern in a second recording layer in an opposite path of a DVD disc.

FIG. 4B shows a groove pattern in a first recording layer in an opposite path of a DVD disc.

FIG. 11C shows a variation of the layout of recording layers shown in FIG. 11B.

FIG. 24A is a flowchart for illustrating an assignment procedure of replacement sectors according to embodiment 4 of the present invention.

DESCRIPTION OF THE PREFERRED EMBODIMENTS

Embodiment 1

Hereinafter, a multi-layered information recording medium according to embodiment 1 of the present invention is described with reference to the drawings. In the present invention, the multi-layered information recording medium refers to an information recording medium including two or more recording layers.

Figure 1:
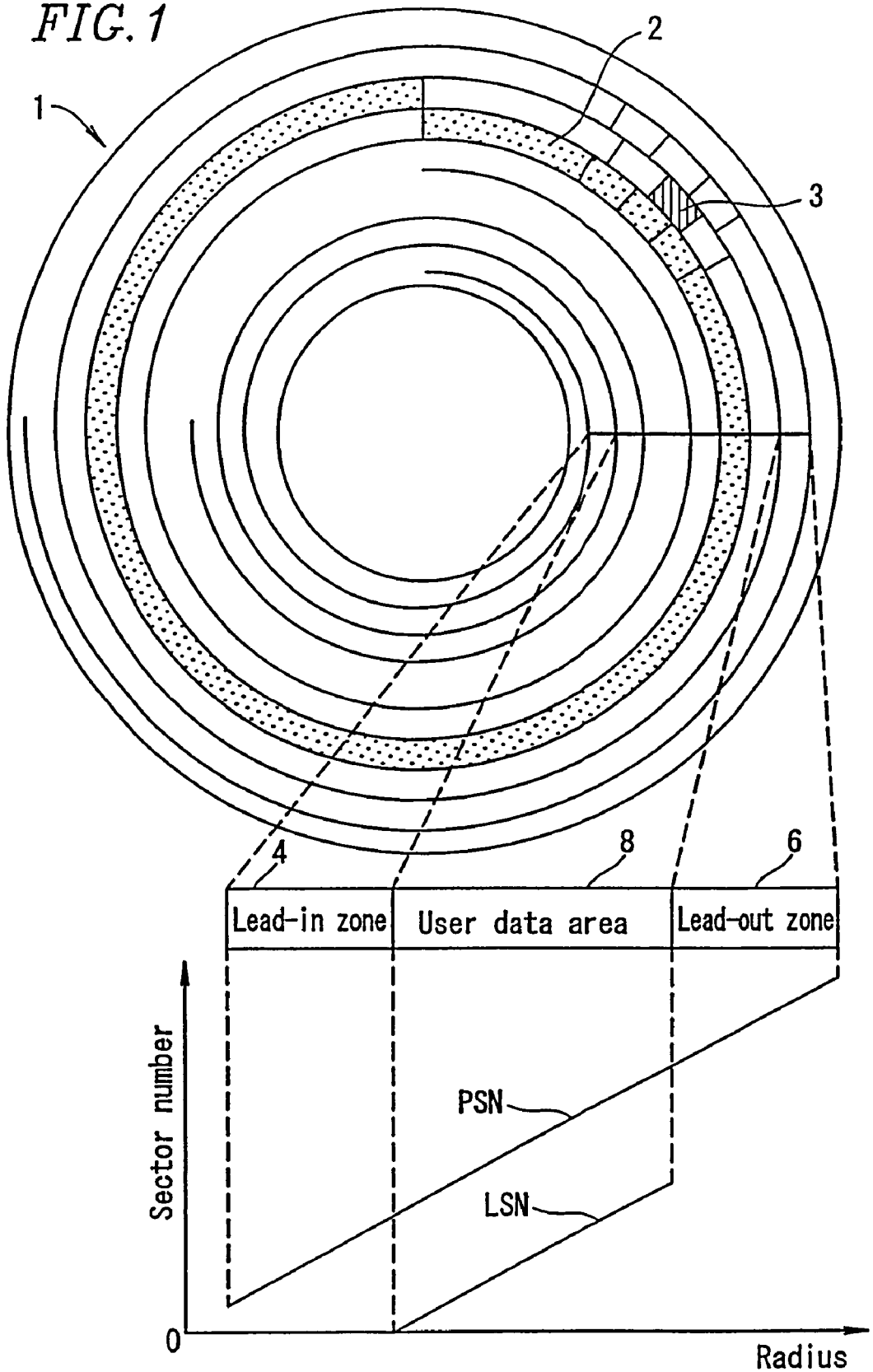
FIG. 1 shows a structure of a track and sectors in a commonly employed optical disc.
Figure 2:
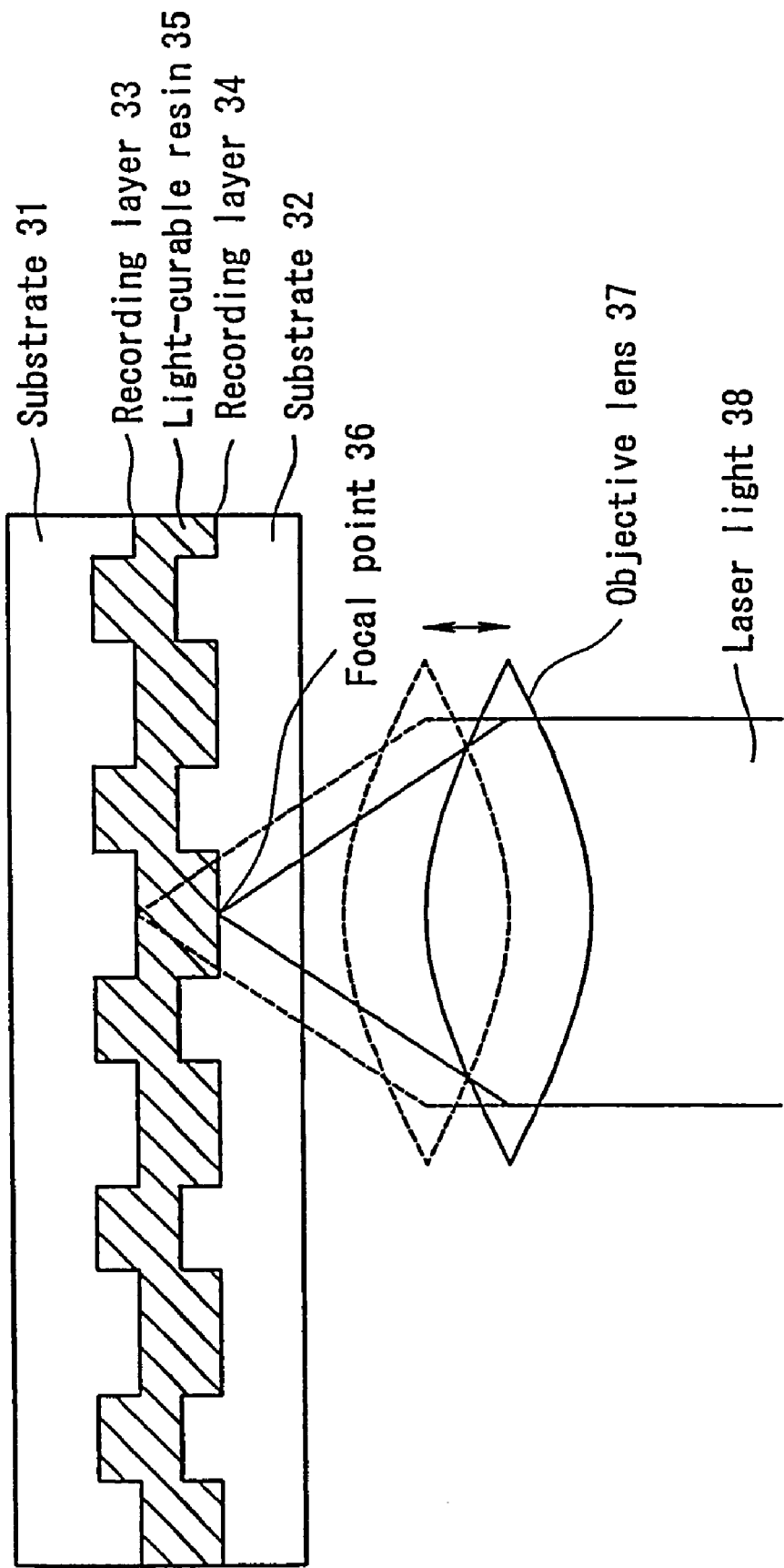
FIG. 2 illustrates a reproduction principle for an optical disc having two recording layers.
Figure 3A:
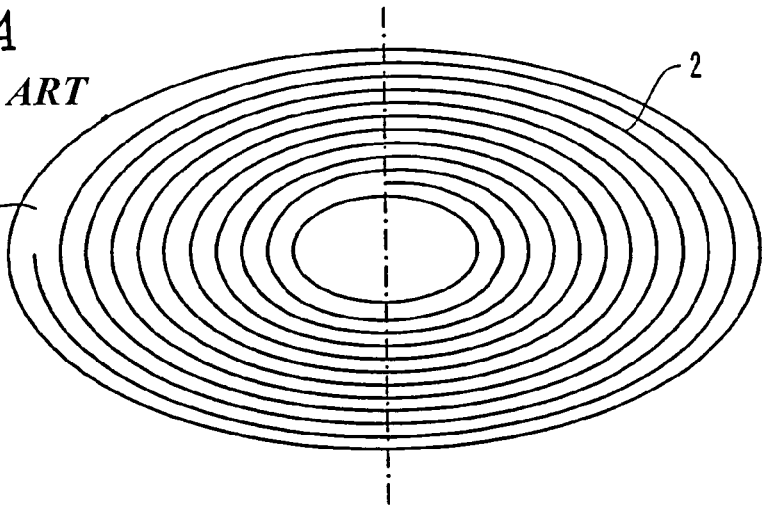
FIG. 3A shows a groove pattern in a second recording layer in a parallel path of a DVD disc.
Figure 3B:
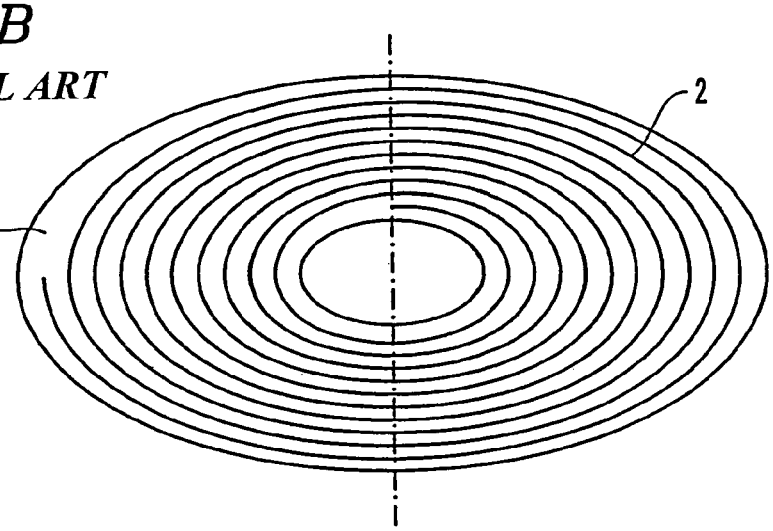
FIG. 3B shows a groove pattern in a first recording layer in a parallel path of a DVD disc.
Figure 3C:
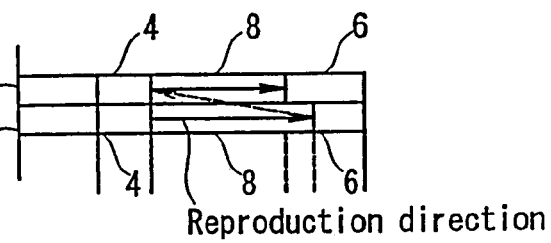
FIG. 3C illustrates a recording/reproduction direction in a parallel path of a DVD disc.
Figure 3D:
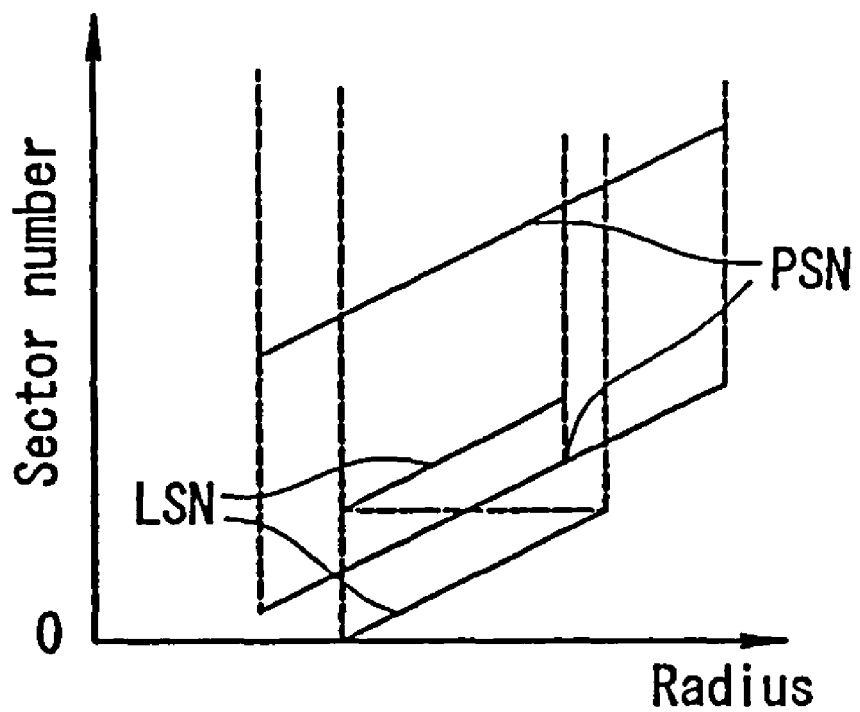
FIG. 3D illustrates assignment of sector numbers in a parallel path of a DVD disc.
Figure 4C:
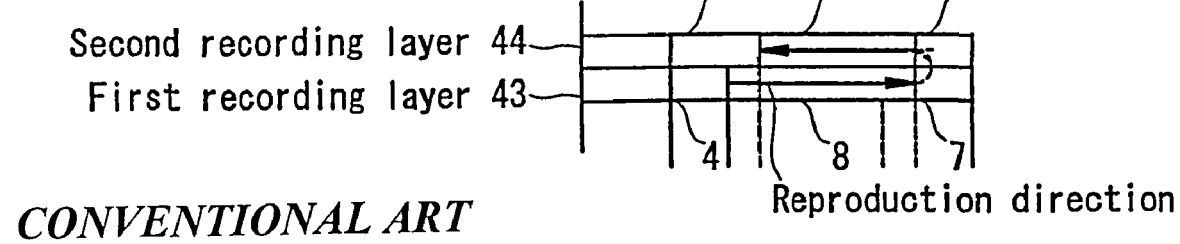
FIG. 4C illustrates a recording/reproduction direction in an opposite path of a DVD disc.
Figure 4D:
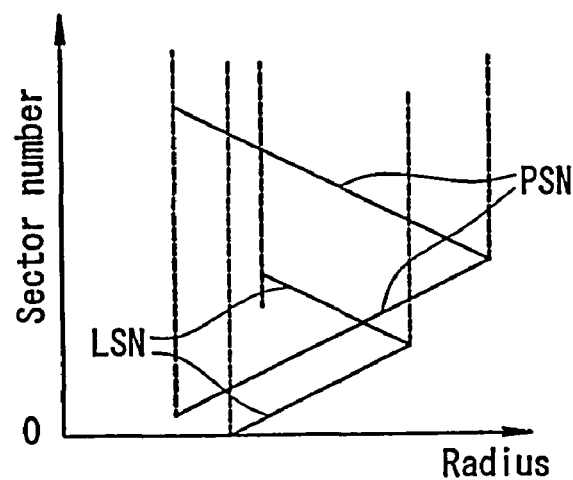
FIG. 4D illustrates assignment of sector numbers in an opposite path of a DVD disc.
Figure 5:
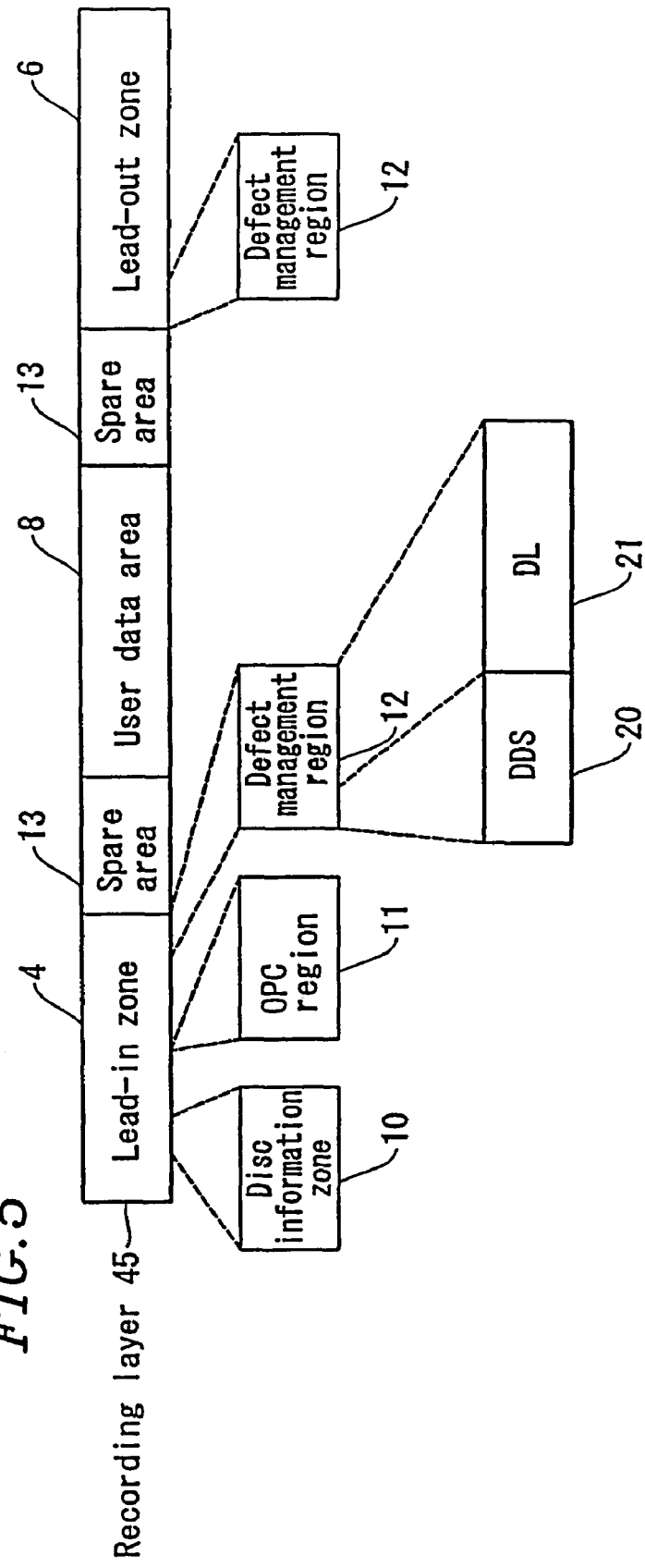
FIG. 5 shows a region layout in a DVD-RAM.
Figure 6:
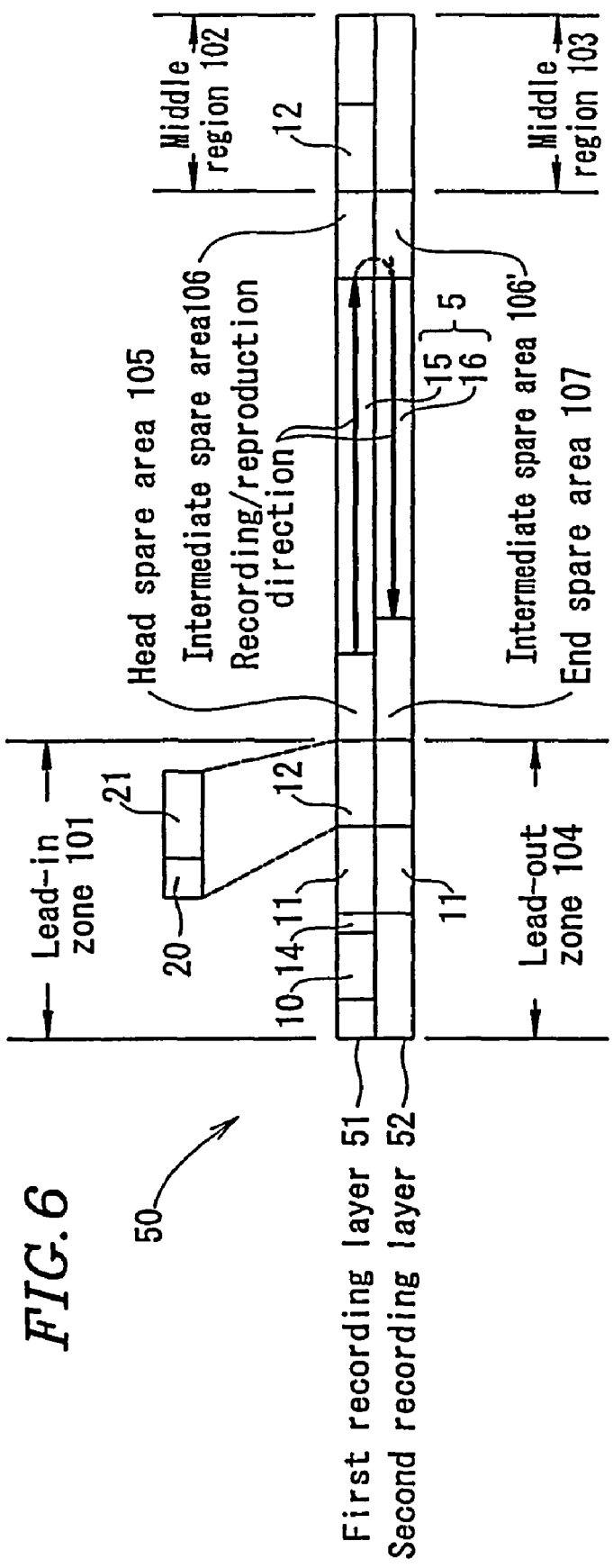
FIG. 6 shows a region layout in a multi-layered information recording medium according to embodiment 1 of the present invention.

FIG. 6 shows a region layout of a multi-layered information recording medium 50 according to embodiment 1 of the present invention. The multi-layered information recording medium 50 includes two recording layers 51 and 52. The multi-layered information recording medium 50 includes a user data area 5 for recording user data. In this embodiment of the present invention, the upper recording layer shown in FIG. 6 is referred to as a first recording layer, and the lower recording layer is referred to as a second recording layer. The first recording layer 51 includes, from the inner circumference side to the outer circumference side along the recording/reproduction direction, a lead-in zone 101, a head spare area 105, a first user data area 15, which is a portion of the user data area 5, an intermediate spare area 106, and a middle region 102. The second recording layer 52 includes, from the outer circumference side to the inner circumference side along the recording/reproduction direction, a middle region 103, an intermediate spare area 106', a second user data area 16, which is a portion of the user data area 5, an end spare area 107, and a lead-out zone 104.

Each of the head spare area 105, the intermediate spare area 106, the intermediate spare area 106', and the end spare area 107 includes at least one replacement region (which is a "spare sector" in the embodiments of the present invention). When the user data area 5 has at least one defect region (which is a "defect sector" in the embodiments of the present invention), the spare sector can be used in place of the defect sector.

The lead-in zone 101 includes a disc information zone 10, an OPC region 11, and a defect management region 12. The defect management region 12 is included in the middle region 102. The OPC region 11 is included in the lead-out zone 104. The defect management region 12 includes a DDS 20 and DL 21.

The disc information zone 10 is provided in the first recording layer 51. The disc information zone 10 includes recording/reproduction parameters which are recommended for both the first and second recording layers 51 and 52. With such a structure, the parameters for all the recording layers 51 and 52 of the multi-layered information recording medium 50 can be obtained by simply accessing the first recording layer 51. Thus, the processing speed can be advantageously increased.

The defect management region 12 is provided in the first recording layer 51. The defect management region 12 includes defect management information about defect management for both the first and second recording layers 51 and 52. That is, the DDS 20 describes information about the head spare area 105, the intermediate spare area 106, and the end spare area 107. Further, the DL 21 lists the positions of defect sectors and the positions of replacement sectors which are provided for use in place of the defect sectors for both the first and second recording layers 51 and 52. With such a structure, all of the information about defect management of the multi-layered information recording medium 50 can be obtained by simply accessing the first recording layer 51. Thus, the processing speed can be advantageously increased.

The head spare area 105 and the intermediate spare area 106 are placed contiguous to the both ends of the user data area 15. The intermediate spare area 106' and the end spare area 107 are placed contiguous to the both ends of the user data area 16. This arrangement has an advantage such that a sequential recording/reproduction operation along the recording/reproduction direction can be performed at a high speed as compared with a case where the spare areas 105 to 107 are placed such that the spare areas divide the user data area 15 or 16 at an intermediate portion. Further, the intermediate spare area 106 and the intermediate spare area 106' are placed at the same radial position in the multi-layered information recording medium 50. With this arrangement, when the focal position of laser light transits from the user data area 15 of the first recording layer 51 to the user data area 16 of the second recording layer 52, the moving distance of the optical head along the radial direction is ideally zero (0), and therefore, a higher accessing speed can be achieved. Herein, the moving distance is ideally zero, i.e., may not be zero, because a deviation may occur when the first recording layer 51 and the second recording layer 52 are combined, or the focal position of laser light deviates to an amount corresponding to the eccentricity of the disc during the switching of the focal position of the laser light, and in such a case, a slight movement of the laser light along the radial direction is necessary.

The OPC region 11 provided for calibrating the recording power of the laser light is provided in both the first recording layer 51 and the second recording layer 52. This is because one of the recording layers is translucent, whereas the thickness of the other recording layer is calibrated so as to reflect all of the laser light, and accordingly, the recording characteristics are different for each recoding layer. Thus, the OPC region 11 is provided in each of the first recording layer 51 and the second recording layer 52 so that calibration of the recording power of the laser light can be performed independently in each recording layer.

It is desirable that storage regions for control information other than the disc information zone 10 and the defect management region 12, such as a calibration result storage region 14 for storing the calibration result for the recording power of the laser light, are provided in the first recording layer 51 in view of the processing speed as described above.

Each of the sizes of the head spare area 105, the intermediate spare area 106, and the end spare area 107 may be zero. For example, in the case where the sizes of the head spare area 105 and the intermediate spare area 106 are not zero, and the size of the end spare area 107 is zero, the above described advantages of the present invention can be achieved.

Figure 7:
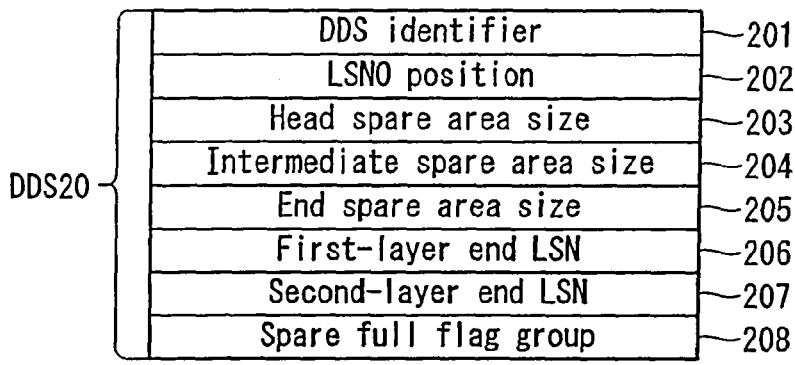
FIG. 7 shows a data structure of a DDS 20 according to embodiment 1 of the present invention.

FIG. 7 shows the data structure of the DDS 20 according to embodiment 1 of the present invention. The data of the DDS 20 includes a DDS identifier 201, a LSN0 position 202, a head spare area size 203, and an intermediate spare area 203, an intermediated spare area size 204, an end spare area size 205, a first-layer end LSN 206, a second-layer end LSN 207, and a spare full flag group 208. The DDS identifier 201 indicates that this data structure is DDS. The LSN0 position 202 represents the PSN (i.e., physical address) of a sector whose LSN (i.e., logical address) is 0. The head spare area size 203 represents the number of sectors in the head spare area 105. The intermediate spare area size 204 represents the number of sectors in the intermediate spare area 106. The end spare area size 205 represents the number of sectors in the end spare area 107. The first-layer end LSN 206 represents the LSN assigned to the last sector in the user data area 15 of the first recording layer 51. The first-layer end LSN 206 is identical to the number of sectors in the user data area 15. The second-layer end LSN 207 represents the LSN assigned to the last sector in the user data area 16 of the second recording layer 52. The second-layer end LSN 207 is equal to a value obtained by adding the number of sectors in the user data area 15 to the number of sectors in the user data area 16. The spare full flag group 208 is a group of flags which represent whether or not there is an available spare sector in the spare areas 105 to 107.

Figure 8:
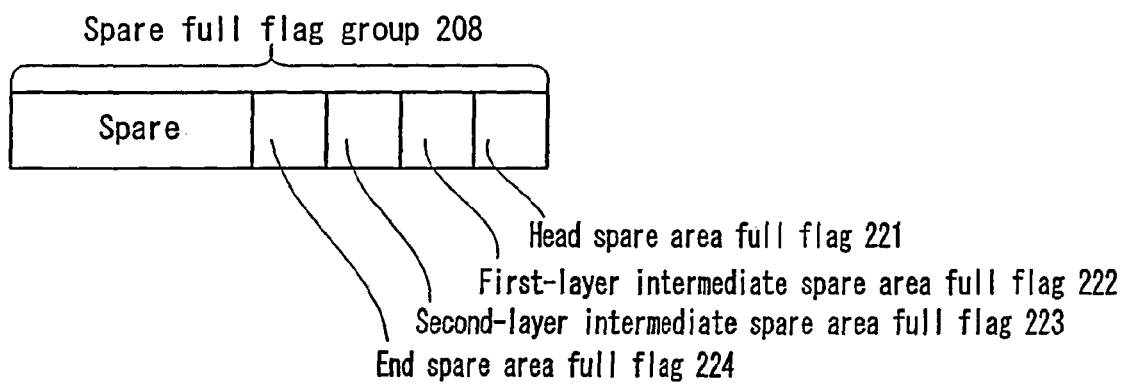
FIG. 8 shows a spare full flag group 208 according to embodiment 1 of the present invention.

FIG. 8 shows an example of the spare full flag group 208. Ahead spare area full flag 221 corresponds to the head spare area 105. A first-layer intermediate spare area full flag 222 corresponds to the intermediate spare area 106. A second-layer intermediate spare area full flag 223 corresponds to the intermediate spare area 106'. A second-layer end spare area full flag 224 corresponds to the end spare area 107. The present invention is not limited to this flag arrangement so long as the spare full flag group 208 includes flags corresponding to the spare areas 105 to 107.

Figure 9:
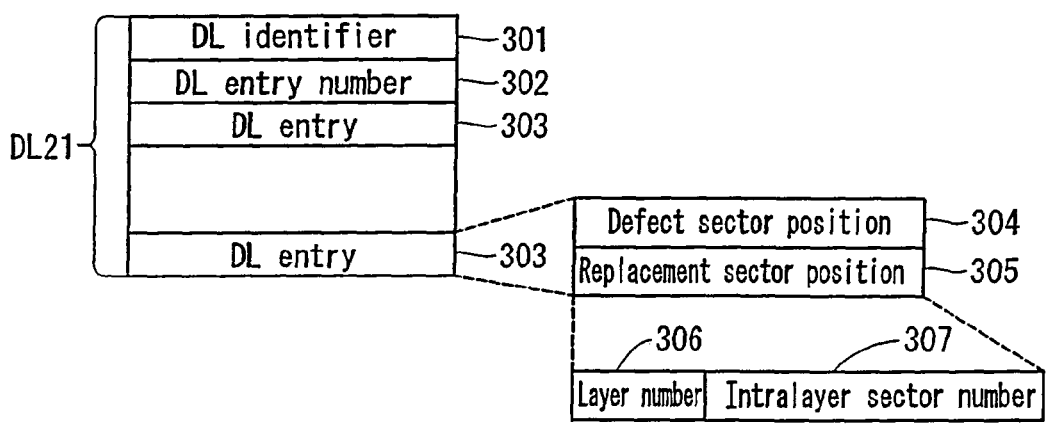
FIG. 9 shows a data structure of a DL 21 according to embodiment 1 of the present invention.

FIG. 9 shows the data structure of the DL 21 according to embodiment 1 of the present invention. The data of the DL 21 includes a DL identifier 301, a DL entry number 302, and 0 (zero) or more DL entries 303. The DL identifier 301 indicates that this data structure is DL. The DL entry number 302 represents the number of DL entries 303. The DL entries 303 each include information about a defect sector position 304 and a replacement sector position 305. The PSN of a defect sector is stored as the defect sector position 304. As the replacement sector position 305, the PSN of a replacement sector is stored. The PSN includes a layer number 306 and an intralayer sector number 307. The layer number 306 may be any value so long as the layer can be identified by the value. For example, the layer number 306 of the first recording layer 51 is 0, and the layer number 306 of the second recording layer 52 is 1. The intralayer sector number 307 may be any value so long as sectors in a certain recording layer can be identified by the value. For example, the intralayer sector number 307 incrementally increases by one every time one sector is passed along the recording/reproduction direction. Even if the relationship between the PSN of a sector in the first recording layer 51 and the PSN of a sector in the second recording layer 52 placed at the same radial position is two's complement, the above-described conditions are satisfied as in the opposite paths of a DVD-ROM. For example, consider that the PSN is represented in the 28-bit format, and the PSN of the first recording layer 51 is within the range of 0000000h to 0FFFFFFh ("h" means that the value is represented by a hexadecimal number). When the PSN of a certain sector in the first recording layer 51 is 0123450h, the PSN of a corresponding sector in the second recording layer 52 at the same radial position is FEDCBAFh (see the following steps 1) to 4)):

| | | | | | | | | |
|---|---|---|---|---|---|---|---|---|
| 1) | 0 | 1 | 2 | 3 | 4 | 5 | 0 | : hexadecimal number |
| 2) | 0000 | 0001 | 0010 | 0011 | 0100 | 0101 | 0000 | : binary number |
| 3) | 1111 | 1110 | 1101 | 1100 | 1011 | 1010 | 1111 | : bit-inverted binary number |
| 4) | F | E | D | C | B | A | F | : hexadecimal number |

The most significant bit of the PSN of the first recording layer 51 is always zero, and the most significant bit of the PSN of the second recording layer 52 is always F. This most significant bit is equal to the layer number 306. In the first recording layer 51, when the track is followed along the recording/reproduction direction (from the inner circumference side to the outer circumference side), the PSN of the next sector is 0123451h. In the second recording layer 52, when the track is followed along the recording/reproduction direction (from the outer circumference side to the inner circumference side), the PSN of the next sector is FEDCBB0h. The sector number 307 can be obtained by simply removing the most significant bit (i.e., the layer number 306) from the PSN. In the first recording layer 51, the sector number 307 of a current sector is 123450h, and the sector number 307 of a next sector is 123451h. In the second recording layer 52, the sector number 307 of a current sector is EDCBAFh, and the sector number 307 of a next sector is EDCBB0h.

When the DL 21 of the present invention is used, a defect sector can be replaced with a spare sector in a spare area provided in the same recording layer in which the defect sector is included, and moreover, a defect sector can be replaced with a spare sector of a recording layer different from the recording layer in which the defect sector is included. For example, a DL entry 303 wherein the defect sector position 304 represents the PSN in the first recording layer 51, and the replacement sector position 305 represents the PSN in the second recording layer 52, means that a defect sector in the first user data area 15 of the first recording layer 51 was replaced with a spare sector in the second recording layer 52. If a defect list is formed by DL entries based on which a recording layer cannot be identified, as in the conventional art, replacement processing cannot be successfully performed when the number of defect sectors is greater than the number of spare sectors provided in a recording layer. Thus, according to embodiment 1 of the present invention, defect sectors can be replaced with spare sectors until all the spare sectors of all the recording layers are used. That is, the spare areas can be efficiently used.

Figure 10:
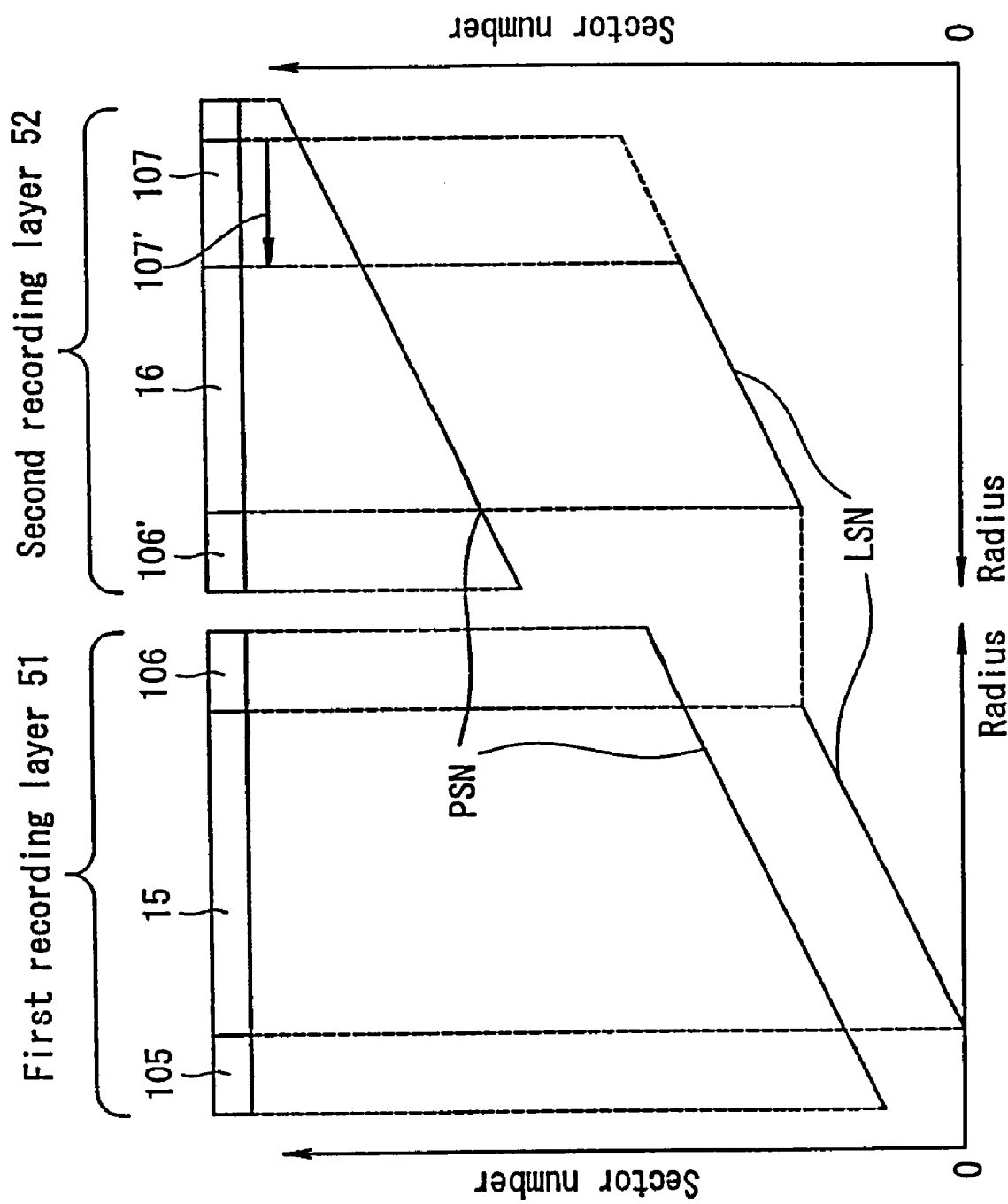
FIG. 10 illustrates assignment of sector numbers in embodiment 1 of the present invention.

FIG. 10 illustrates the assignment of the sector numbers according to embodiment 1 of the present invention. The sector numbers assigned from the inner circumference to the outer circumference in the first recording layer 51 and then from the outer circumference to the inner circumference in the second recording layer 52 are arranged horizontally from left to right in the drawing. Thus, from left to right in the drawing, the head spare area 105, the first user data area 15, the intermediate spare area 106, the intermediate spare area 106', the second user data area 16, and the end spare area 107 occur in this order. Each of these regions and areas include a plurality of sectors. In the first recording layer 51, the PSN increases by 1 every time a single sector is passed toward the outer circumference side; whereas in the second recording layer 52, the PSN increases by 1 every time a single sector is passed toward the inner circumference side. The assignment may be made such that values obtained by removing the layer number (i.e., the most significant bit) from the PSNs of the first recording layer 51 are in the same numeric range as values obtained by removing the layer number (i.e., the most significant bit) from the PSNs of the second recording layer 52. (That is, the minimum PSN within the sectors included in the head spare area 105 of the first recording layer 51 is identical to the minimum PSN within the sectors included in the intermediate spare area 106' of the second recording layer 52 except for the layer number; and the maximum PSN within the sectors included in the intermediate spare area 106 of the first recording layer 51 is identical to the maximum PSN within the sectors included in the end spare area 107 of the second recording layer 52 except for the layer number.) The relationship of the PSN of a sector in the first recording layer 51 and the PSN of a sector in the second recording layer 52 placed at the same radial position may be two's complement as in the opposite paths of a DVD-ROM.

The LSNs are assigned only to a plurality of sectors included in the user data area 5. In the first user data area 15, the LSNs are assigned along the circumference direction of the multi-layered information recording medium 50. In the second user data area 16 also, the LSNs are assigned along the circumference direction of the multi-layered information recording medium 50. The LSNs assigned to the first user data area 15 and the LSNs assigned to the second user data area 16 are consecutive numbers.

In the first user data area 15 of the first recording layer 51, 0 (zero) is assigned to a sector at the innermost circumference position as a LSN. The LSN incrementally increases by 1 every time one sector is passed from the inner circumference side to the outer circumference side. In the second user data area 16 of the second recording layer 52, a value obtained by adding 1 to the maximum LSN within the first user data area 15 of the first recording layer 51 is assigned to a sector at the outermost circumference position as a LSN. The LSN incrementally increases by 1 every time one sector is passed from the outer circumference side to the inner circumference side. In this way, in the second user data area 16, the logical addresses (i.e., LSNs) are assigned along a direction opposite to the assignment direction in the first user data area 15.

The intermediate spare area 106 is positioned contiguous to a sector having the maximum logical address (i.e., maximum LSNs) in the first user data area 15. The intermediate spare area 106' is positioned contiguous to a sector having the minimum logical address (i.e., minimum LSNs) in the second user data area 16. As described above, the intermediate spare area 106 and the intermediate spare area 106' are placed at the same radial position of the multi-layered information recording medium 50. Accordingly, the sector having the maximum logical address in the first user data area 15 and the sector having the minimum logical address in the second user data area 16 are at the same radial position of the multi-layered information recording medium 50. Due to this arrangement, the moving distance of laser light along the radial direction is ideally zero when the focal position of the laser light is switched from the sector having the maximum logical address in the first user data area 15 to the sector having the minimum logical address in the second user data area 16.

Even if user data has already been recorded in the user data area 5, the size of the spare areas can be increased. This is explained with reference to FIG. 10. The end spare area 107 is placed contiguous to a sector having the maximum LSN in the user data area 5. The end spare area 107 can be expanded in a direction from the end spare area 107 toward the second user data area 16 (i.e., the direction indicated by arrow 107' in FIG. 10).

First, before the end spare area 107 is expanded in the direction indicated by arrow 107', user data recorded in a portion of the second user data area 16 which will be converted to the end spare area 107 is transferred to another portion of the user data area 5. Then, the file management information of the transferred user data is modified such that the file management information of the transferred user data (which is one of the information managed by a file system) refers to a sector position to which the user data has been transferred. Next, change of the size of the user data area 5 is reflected in the volume space management information (which is one of the information managed by a file system).

Then, in the last step, the size of the end spare area 107 is increased. It should be noted that increasing the sizes of the head spare area 105 and the intermediate spare areas 106 and 106' is not practical because, if the sizes of these regions are increased, the assignment of the LSNs to the user data area 5 are changed, and as a result, the file system for managing the user data area 5 using the LSNs would corrupt.

As described above, according to embodiment 1 of the present invention, in a multi-layered information recording medium having two recording layers, continuous accessibility can be improved. Furthermore, a defect sector can be replaced with a spare area in any recording layer, and therefore, the spare areas can be efficiently used. Furthermore, the size of the spare area can be increased so as to prevent lack of spare areas, whereby reliability of data can be improved.

Embodiment 2

Hereinafter, a multi-layered information recording medium according to embodiment 2 of the present invention is described with reference to the drawings.

Figure 11A:
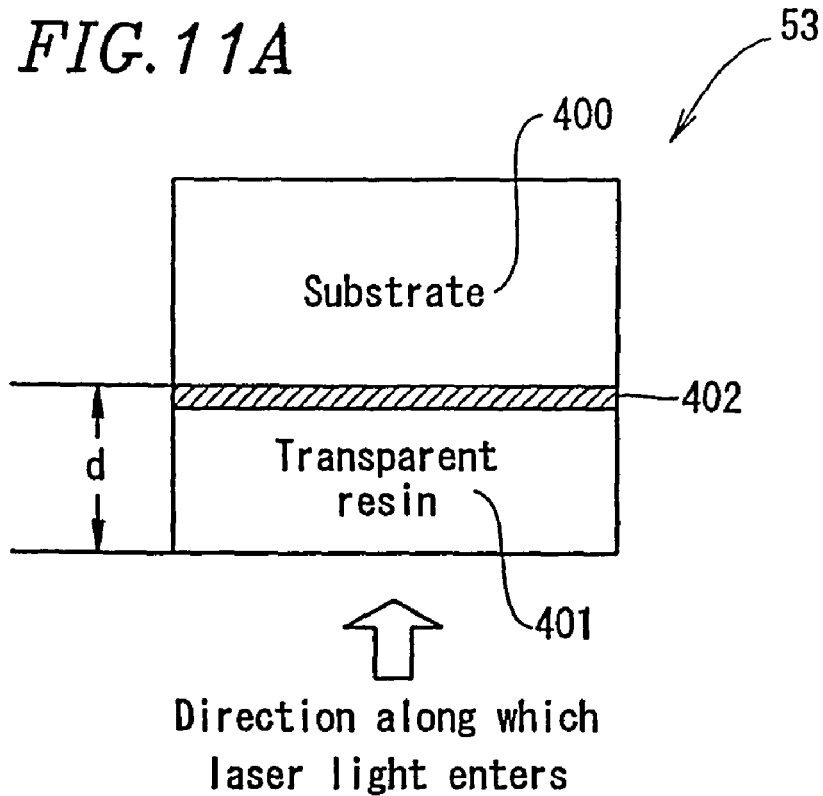
FIG. 11A shows a layout of a recording layer included in an information recording medium having a single recording layer.
Figure 11B:
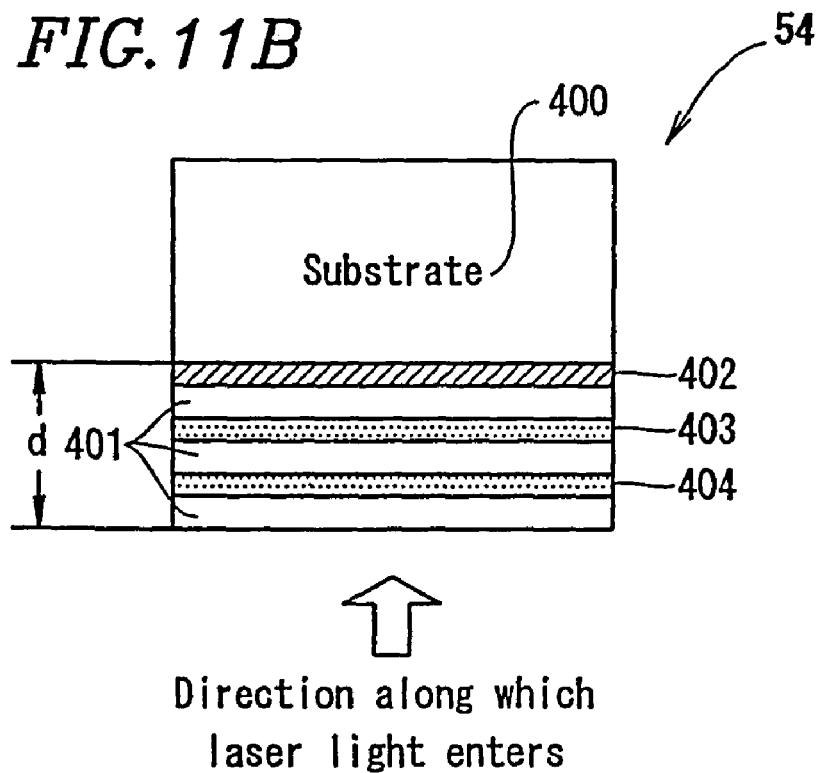
FIG. 11B shows a layout of recording layers included in a multi-layered information recording medium according to embodiment 2 of the present invention.

First, a reference layer which is used as a reference among a plurality of recording layers included in a multi-layered information recording medium is described. FIGS. 11A, 11B and 11C illustrate a layout of recording layers of an information recording medium according to embodiment 2. FIG. 11A illustrates a layout of layers included in an information recording medium 53 having a single recording layer 402. In FIG. 11A, the information recording medium 53 includes a transparent resin 401, a total reflection recording layer 402, and a substrate 400 along a direction through which laser light enters the information recording medium 53. The total reflection recording layer 402 is positioned at depth d from the surface of the transparent resin 401 through which the laser light enters. FIGS. 11B and 11C illustrate layouts of the layers included in information recording mediums 54 and 55 each of which has three recording layers 402, 403 and 404. In these layouts, the translucent recording layers 403 and 404 are provided in this order, toward coming laser light, on the total reflection recording layer 402 which is formed on the substrate 400, such that the translucent recording layers 403 and 404 are sandwiched by the transparent resin 401. In the information recording medium 54 of FIG. 11B, the total reflection recording layer 402 is at depth d from the surface of the outermost transparent resin layer 401 through which the laser light enters the information recording medium 54. In the information recording medium 55 of FIG. 11C, the translucent recording layer 403 is at depth d from the surface of the outermost transparent resin layer 401 through which the laser light enters the information recording medium 55. This is a typical difference between the information recording medium 54 and the information recording medium 55.

In general, an optical head section is designed such that an optimum light spot is obtained at depth d. Herein, a recording layer at depth d is referred to as a reference layer for convenience of explanation. Regions where important information is to be stored, for example, a disc information zone 10 and a defect management region 12, are desirably positioned in the reference layer. In FIG. 6, the first recording layer 51, in which the disc information zone 10, the defect management region 12, and the calibration result storage region 14 are positioned, is a reference layer.

In the description below, the recording layers are referred to as a first recording layer, a second recording layer, a third recording layer, . . . , in the order of largeness of the LSN from the minimum LSN. For example, in the information recording medium 54 shown in FIG. 11B, the total reflection recording layer 402 is referred to as the first recording layer, the translucent recording layer 403 is referred to as the second recording layer, and the translucent recording layer 404 is referred to as the third recording layer. Further, for example, in the information recording medium 55 illustrated in FIG. 11C, the translucent recording layer 403 is referred to as the first recording layer, the translucent recording layer 404 is referred to as the second recording layer, and the total reflection recording layer 402 is referred to as the third recording layer. Thus, the numbering for recording layers does not necessarily depend on the positional relationship of the recording layers. In the above explanation, examples having three recording layers have been described. However, the above explanation similarly applies to any information recording medium including two or more recording layers.

Figure 12:
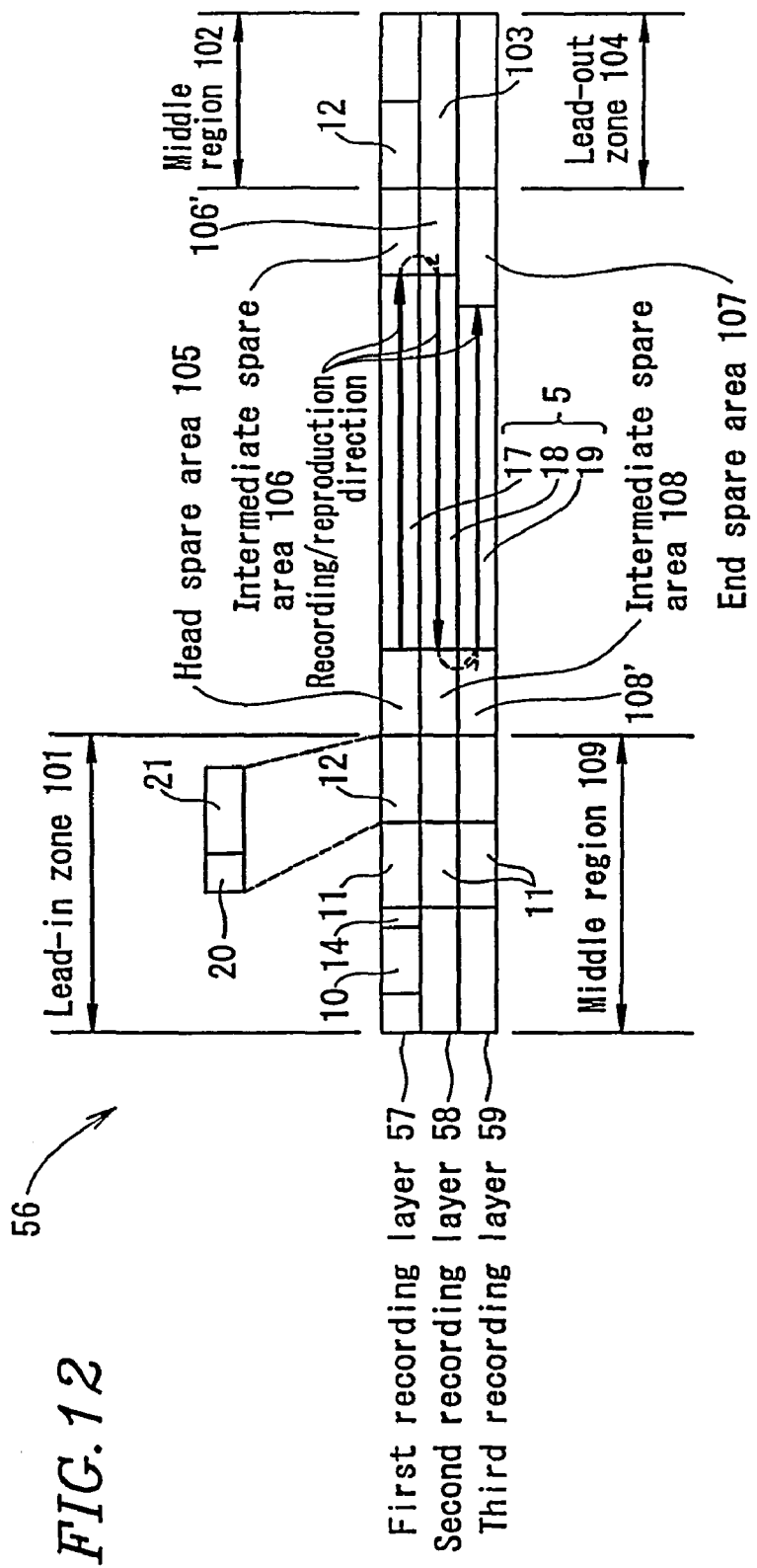
FIG. 12 shows a region layout of a multi-layered information recording medium according to embodiment 2 of the present invention.

FIG. 12 illustrates a region layout of a multi-layered information recording medium 56 according to embodiment 2 of the present invention. The multi-layered information recording medium 56 includes three recording layers 57, 58 and 59. The multi-layered information recording medium 56 includes a user data area 5 for recording user data. The first recording layer 57 includes a lead-in zone 101, a head spare area 105, a first user data area 17 which is a portion of the user data area 5, an intermediate spare area 106, and a middle region 102, from the inner circumference side to the outer circumference side, which is the same direction as the recording/reproduction direction. The second recording layer 58 includes a middle region 103, an intermediate spare area 106', a second user data area 18 which is a portion of the user data area 5, an intermediate spare area 108, and a middle region 109, from the outer circumference side to the inner circumference side, which is the same direction as the recording/reproduction direction. The third recording layer 59 includes a middle region 109, an intermediate spare area 108', a third user data area 19 which is a portion of the user data area 5, an end spare area 107, and a lead-out zone 104, from the inner circumference side to the outer circumference side, which is the same direction as the recording/reproduction direction. The lead-in zone 101 includes a disc information zone 10, an OPC region 11 and a defect management region 12. The middle region 102 includes a defect management region 12. The middle region 109 includes an OPC region 11. The defect management region 12 includes a DDS 20 and a DL 21.

The disc information zone 10 is provided in the first recording layer 57. The disc information zone 10 stores recording/reproduction parameters, which are recommended for each of all the recording layers 57, 58 and 59. With such an arrangement, parameters for all the recording layers 57, 58 and 59 of the multi-layered information recording medium 56 can be obtained by simply accessing the first recording layer 57, and thus, the processing speed can be advantageously increased.

The defect management region 12 is provided in the first recording layer 57, and includes defect management information for defect management in all the recording layers 57, 58 and 59. That is, the DDS 20 describes a head spare area 105, intermediate spare areas 106, 106', 108 and 108', and information about the end spare area 107. The DL 21 lists the positions of defect sectors in all of the recording layers 57, 58 and 59, and the positions of replacement sectors which are used in place of the defect sectors. With such an arrangement, all information about defect management of the multi-layered information recording medium 56 can be obtained by simply accessing the first recording layer 57, and thus, the processing speed can be advantageously increased.

Each of the spare areas 105 to 108' of the recording layers 57 to 59 is provided at the position contiguous to either end portion of the first to third user data areas 17 to 19. This arrangement is advantageous because sequential recording/reproduction along the recording/reproduction direction can be performed at a high speed, as compared with a case where a spare area is provided at a position such that any of the first to third user data areas 17 to 19 is interrupted by the spare area. Further, the intermediate spare areas 106 and 106' are provided at the same radial position in an area of the outer circumference side of the recording layers 57 and 58. With such an arrangement, the moving distance of an optical head section along the radial direction is ideally zero when the focal position of the laser light is switched from the first user data area 17 to the second user data area 18. Thus, accessing at a higher speed can be realized. Further, the intermediate spare areas 108 and 108' are provided at the same radial position in an area of the inner circumference side of the recording layers 58 and 59. With such an arrangement, the moving distance of an optical head section along the radial direction is ideally zero when the focal position of the laser light is switched from the second user data area 18 to the third user data area 19. Thus, the processing speed can be advantageously increased.

Herein, the moving distance is ideally zero, i.e., may not be zero, because a deviation may occur when the recording layers 57 to 59 are combined, or because the focal position of laser light deviates to an amount corresponding to the eccentricity of the disc during the switching of the focal position of the laser light, and in such a case, a slight movement of the laser light along the radial direction is necessary.

An OPC region 11 is provided in each of all the recording layers 57 to 59 because the recording layers 57 to 59 have different recording characteristics. Thus, the OPC region 11 is provided in each of the recording layers 57 to 59 such that calibration of the recording power can be performed separately in any recording layer.

Each of the sizes of the head spare area 105, the intermediate spare areas 106, 106', 108 and 108', and the end spare area 107 may be zero. For example, in the case where each of the sizes of the head spare area 105 and the intermediate spare areas 106, 106', 108 and 108' are not zero, and the size of the end spare area 107 is zero, the above described advantages of the present invention can be achieved.

Figure 13:
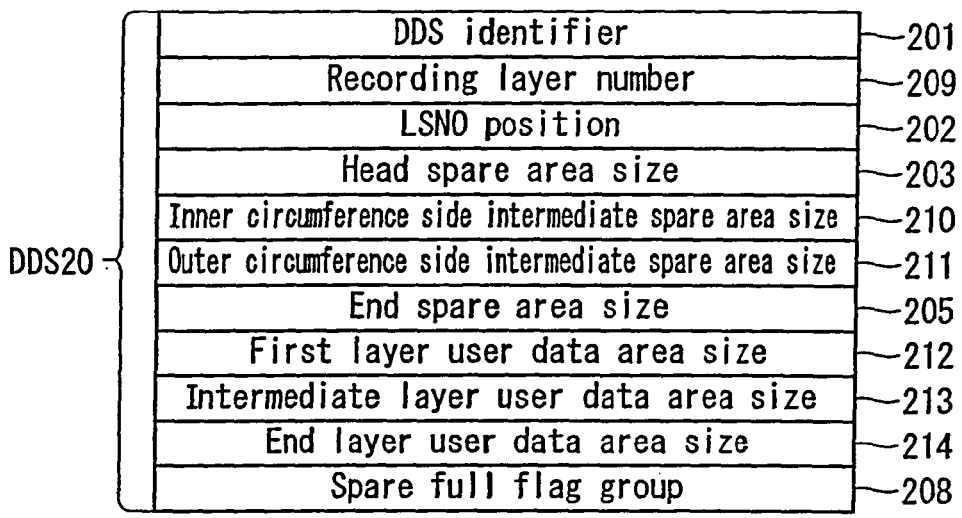
FIG. 13 shows a data structure of a DDS 20 according to embodiment 2 of the present invention.

FIG. 13 shows a data structure of a DDS 20 according to embodiment 2 of the present invention. The DDS 20 includes a DDS identifier 201, a recording layer number 209, a LSN0 position 202, a head spare area size 203, an intermediate spare area size 210 at the inner circumference side, an outer circumference side intermediate spare area size 211, the end spare area size 205, a first layer user data area size 212, an intermediate layer user data area size 213, the end layer user data area size 214, and a spare full flag group 208. In FIG. 13, like elements are indicated by like reference numerals used in embodiment 1, and detailed descriptions thereof are omitted. The recording layer number 209 indicates the total number of recording layers. The inner circumference side intermediate spare area size 210 indicates the number of sectors in the intermediate spare areas 108 and 108' at the inner circumference side. The outer circumference side intermediate spare area size 211 indicates the number of sectors in the intermediate spare areas 106 and 106' at the inner circumference side. The first layer user data area size 212 indicates the number of sectors in the first user data area 17. The first layer user data area size 212 is equal to the maximum value of the LSN assigned to the first user data area 17, and therefore, is equal to the first layer last LSN 206 in embodiment 1. The intermediate layer user data area size 213 indicates the number of sectors in the second user data area 18. The intermediate layer user data area size 213 indicates the number of sectors in the second user data area 18. The end layer user data area size 214 indicates the number of sectors in the third user data area 19.

The DDS 20 shown in FIG. 13 can be applied to any multi-layered information recording medium having two or more recording layers. For example, consider that the DDS 20 is applied to a multi-layered information recording medium having four recording layers. In this case, the recording layer number 209 is four. The intermediate layer user data area size 213 indicates the number of sectors in the user data area of the second recording layer, and also indicates the number of sectors in the user data area of the third recording layer. The end layer user data area size 214 indicates the number of sectors in the user data area of the fourth recording layer.

If the region layout is limited such that the number of sectors included in the intermediate spare areas 108 and 108' at the inner circumference side is the same as the number of sectors included in the intermediate spare areas 106 and 106' at the outer circumference side, two information fields, the inner circumference side intermediate spare area size 210 and the outer circumference side intermediate spare area size 211, can be gathered into a single information field because in such a case the size 210 and the size 211 are always equal. This information field is equivalent to the intermediate spare area size 204 described in embodiment 1. If the region layout is limited such that the number of sectors included in the head spare area 105 is the same as the number of sectors included in the intermediate spare areas 108 and 108' at the inner circumference side, the head spare area size 203 and the intermediate spare area size 210 can be gathered into a single information field. Further, the first layer user data area size 212 and the intermediate layer user data area size 213 may be gathered into a single information field. Thus, information fields which include the identical contents when a certain limitation is made to the region layout can be reduced into a single information field including such a content, and a field obtained by four rules of arithmetic (addition, subtraction, multiplication, and division) may be omitted.

Figure 14:
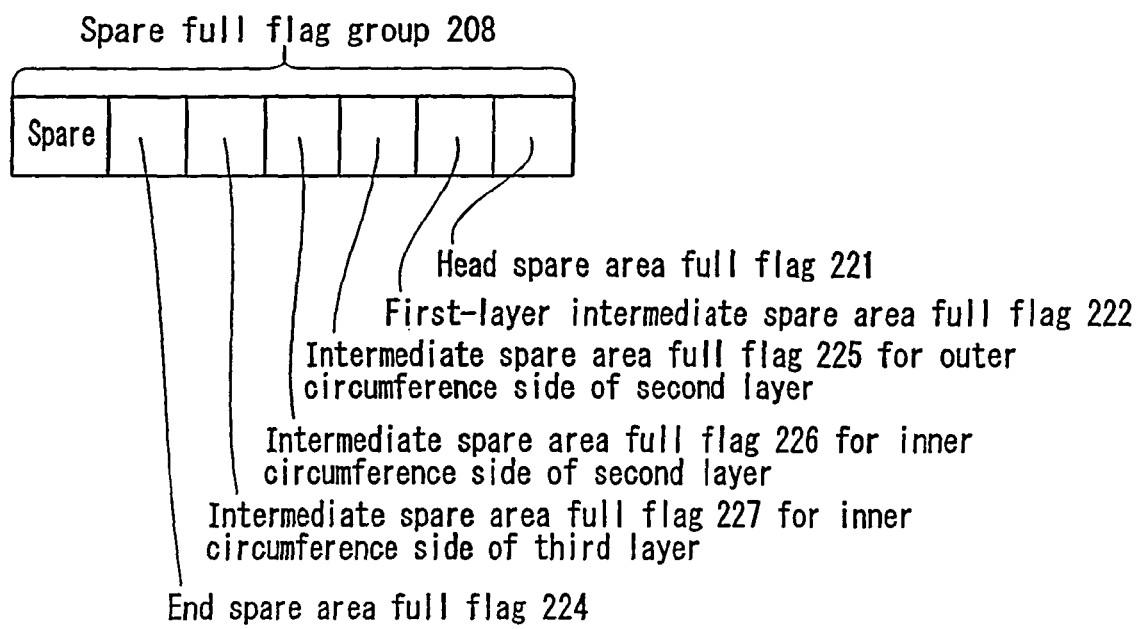
FIG. 14 shows a spare full flag group 208 according to embodiment 2 of the present invention.

FIG. 14 illustrates an example of the spare full flag group 208. The head spare area full flag 221 corresponds to the head spare area 105. The first-layer intermediate spare area full flag 222 corresponds to the intermediate spare area 106. An intermediate spare area full flag 225 for the outer circumference side of the second layer corresponds to the intermediate spare area 106'. An intermediate spare area full flag 226 for the inner circumference side of the second layer corresponds to the intermediate spare area 108. An intermediate spare area full flag 227 for the inner circumference side of the third layer corresponds to the intermediate spare area 108'. The end spare area full flag 224 corresponds to the end spare area 107.

The data structure shown in FIG. 9 can also be applied to the DL 21 of embodiment 2 as in embodiment 1. If the layer number 306 is represented in the 4-bit format, 16 recording layers at the most can be expressed. In embodiment 2 also, defect sectors can be replaced with spare sectors until the spare sectors of all the recording layers are used up. It is clearly appreciated that in such an arrangement, the spare areas can be efficiently used.

Figure 15:
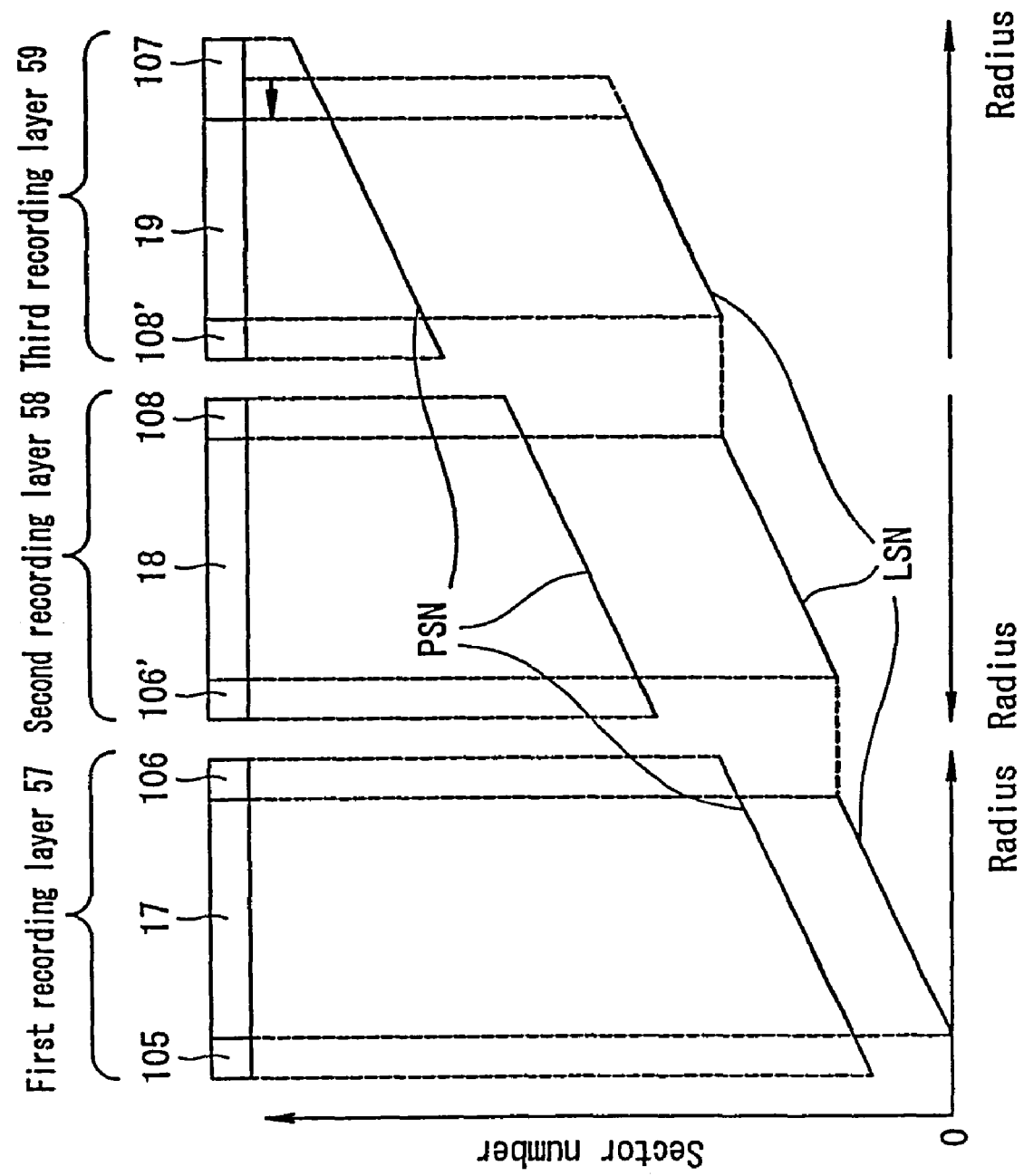
FIG. 15 illustrates assignment of sector numbers in embodiment 2 of the present invention.

FIG. 15 shows assignment of sector numbers according to embodiment 2 of the present invention. The sector numbers assigned from the inner circumference to the outer circumference in the first recording layer 57, from the outer circumference to the inner circumference in the second recording layer 58, and then from the inner circumference to the outer circumference in the third recording layer 59, are arranged horizontally from left to right in the drawing. Thus, from left to right in the drawing, the head spare area 105, the first user data area 17, the intermediate spare area 106, the intermediate spare area 106', the second user data area 18, the intermediate spare area 108, the intermediate spare area 108', the third user data area 19, and the end spare area 107 occur in this order. In the first recording layer 57, the PSN increases by 1 every time a single sector is passed toward the outer circumference side. In the second recording layer 52, the PSN increases by 1 every time a single sector is passed toward the inner circumference side. In the third recording layer 59, the PSN increases by 1 every time a single sector is passed toward the outer circumference side. The assignment directions of LSNs are opposite between contiguous recording layers. The assignment may be made such that values obtained by removing the layer number from the PSNs are in the same numeric range among the first to third recording layers 57 to 59. Alternatively, a rule of assigning PSNs in the opposite paths of a DVD-ROM may be extended such that the relationship between the values of lower bits of the PSN of a sector in an odd-numbered layer and the values of lower bits of the PSN of a sector in an even-numbered layer at the same radial position may be two's complement. In this case, as values of higher bits of the PSNs, 0 may be assigned to the first and second recording layers, 1 may be assigned to the third and fourth recording layers, and 2 may be assigned to the fifth and sixth recording layers.

The LSNs are assigned only to sectors included in the user data area 5. In the first user data area 17, 0 is assigned as the LSN of the sector at the innermost circumference position, and the LSN increases by 1 every time a single sector is passed from the inner circumference side to the outer circumference side. In the second user data area 18, a value obtained by adding 1 to the maximum LSN of the first user data area 17 is assigned as the LSN of the sector at the outermost circumference position, and the LSN increases by 1 every time a single sector is passed from the outer circumference side to the inner circumference side. In the third user data area 19, a value obtained by adding 1 to the maximum LSN of the second user data area 18 is assigned as the LSN of the sector at the innermost circumference position, and the LSN increases by 1 every time a single sector is passed from the inner circumference side to the outer circumference side.

Although a detailed description is herein omitted because it is substantially the same as that provided in embodiment 1, even if user data has already been recorded in the user data area 5 of a multi-layered information recording medium including three or more recording layers, the size of the outermost circumference spare area 107 can be increased.

As described above, according to embodiment 2, continuous accessibility can be improved in a multi-layered information recording medium including two or more recording layers. Furthermore, a defect sector can be replaced with a spare area in any recording layer, and therefore, the spare areas can be efficiently used. Furthermore, the size of the spare area can be increased so as to prevent lack of spare areas, whereby reliability of data can be improved.

Embodiment 3

Hereinafter, a multi-layered information recording medium according to embodiment 3 of the present invention is described with reference to the drawings.

Figure 16:
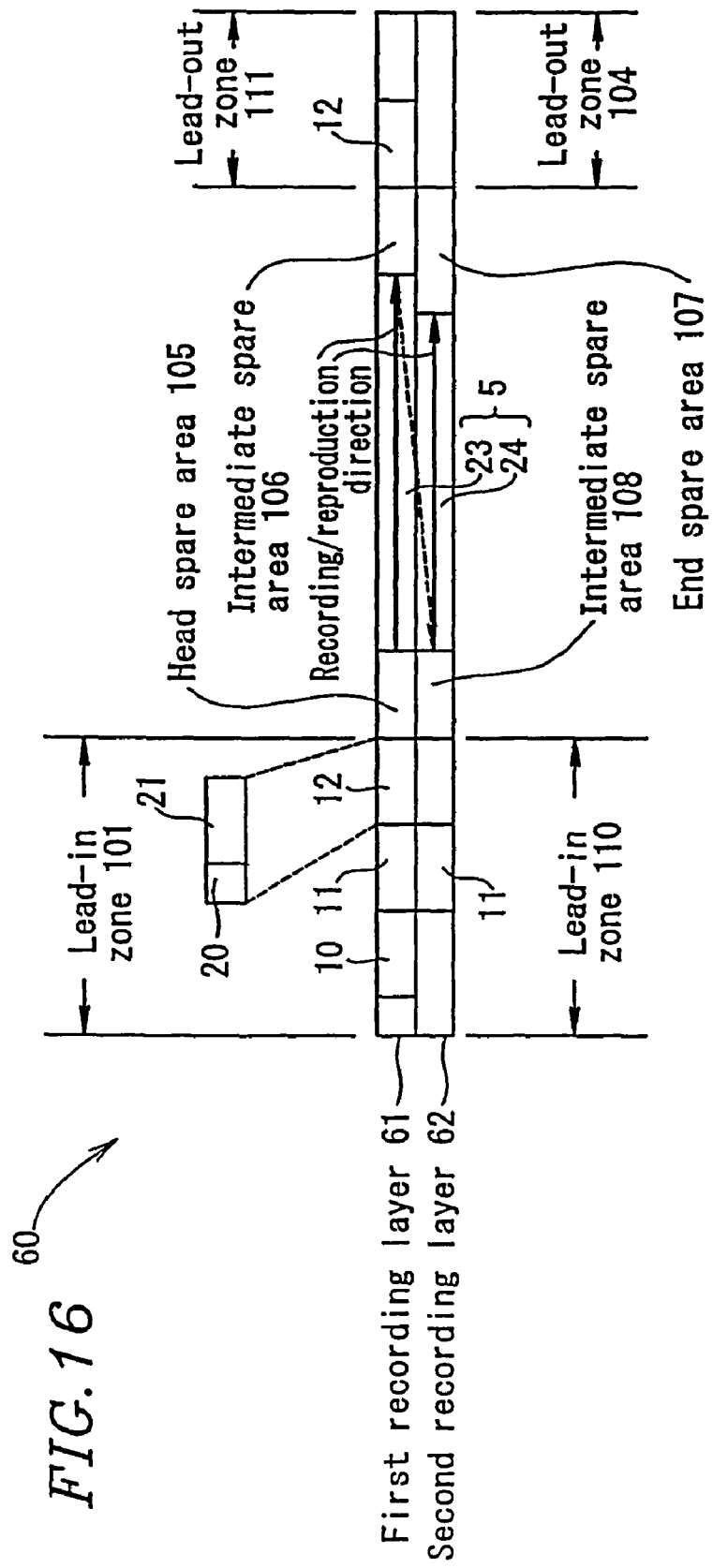
FIG. 16 shows a region layout of a multi-layered information recording medium according to embodiment 3 of the present invention.

FIG. 16 shows a region layout of a multi-layered information recording medium 60 according to embodiment 3 of the present invention. The multi-layered information recording medium 60 includes two recording layers 61 and 62. The recording/reproduction direction is the same in both the first and second recording layers 61 and 62. The multi-layered information recording medium 60 includes a user data area 5 for recording user data. The first recording layer 61 includes, from the inner circumference side to the outer circumference side, a lead-in zone 101, a head spare area 105, a first user data area 23, which is a portion of the user data area 5, an intermediate spare area 106, and a lead-out zone 111. The second recording layer 62 includes, from the inner circumference side to the outer circumference side, a lead-in zone 110, an intermediate spare area 108, a second user data area 24, which is a portion of the user data area 5, an end spare area 107, and a lead-out zone 104. The lead-out zone 111 includes a defect management region 12. The lead-in zone 110 includes an OPC region 11. In FIG. 16, like elements are indicated by like reference numerals used in embodiment 1 or 2, and detailed descriptions thereof are omitted.

The DDS 20 of embodiment 2 shown in FIG. 13 can also be used as the data structure of embodiment 3. In embodiment 3, it is not necessary to provide the intermediate layer user data area size 213.

In embodiment 3, the flag group shown in FIG. 8 is used as the spare full flag group 208 of embodiment 3.

In embodiment 3, the data structure shown in FIG. 9 is used as the DL 21 of embodiment 3. In embodiment 3 also, defect sectors can be replaced with spare sectors until the spare sectors of all the recording layers are used up. It is clearly appreciated that in such an arrangement, the spare areas can be efficiently used.

Figure 17:
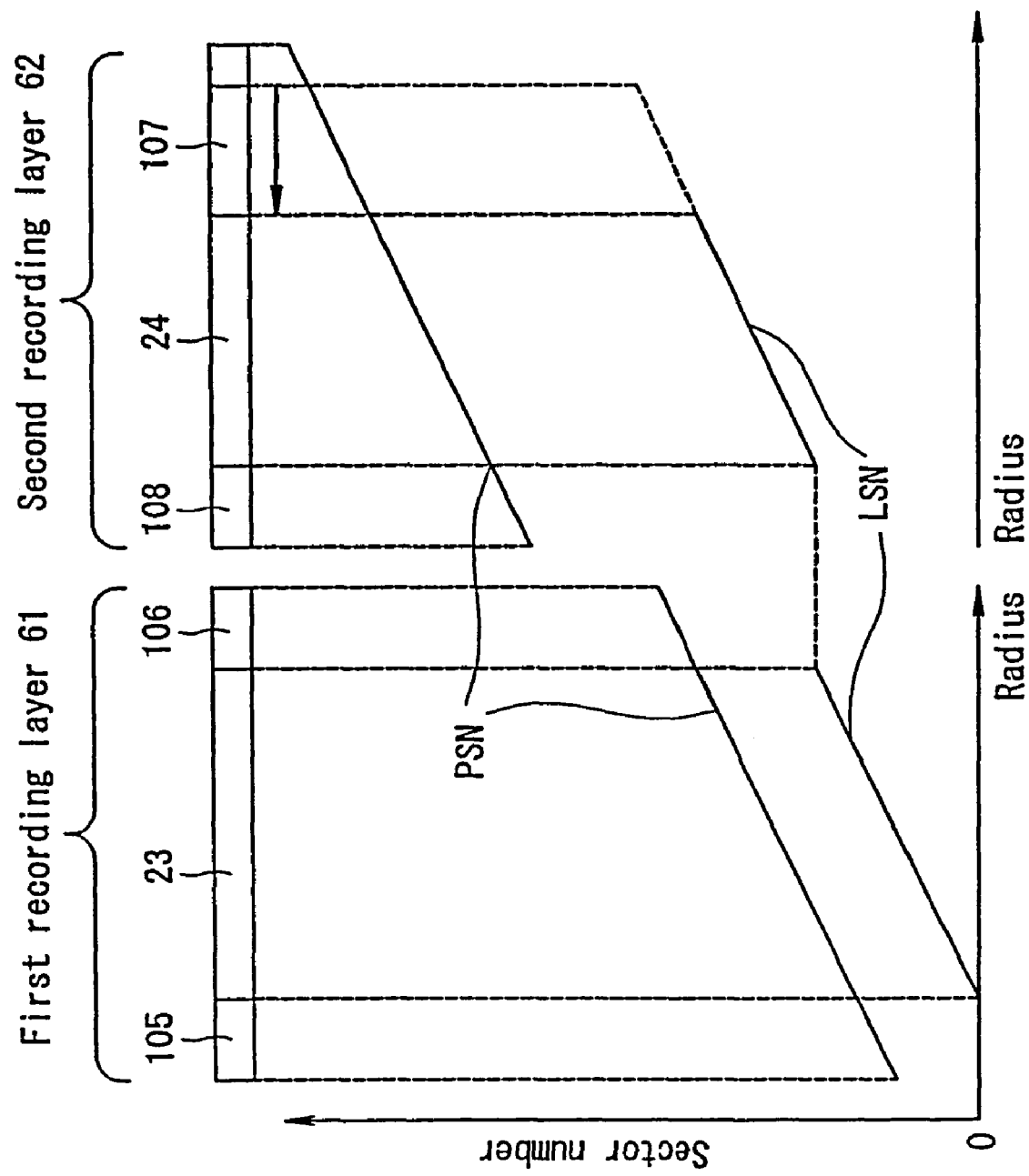
FIG. 17 illustrates assignment of sector numbers in embodiment 3 of the present invention.

FIG. 17 shows assignment of sector numbers according to embodiment 3 of the present invention. The sector numbers assigned from the inner circumference to the outer circumference in the first recording layer 61, and then from the inner circumference to the outer circumference in the second recording layer 62, are arranged horizontally from left to right in the drawing. Thus, from left to right in the drawing, the head spare area 105, the first user data area 23, the intermediate spare area 106, the intermediate spare area 108, the second user data area 24, and the end spare area 107 occur in this order. In both the first recording layer 61 and the second recording layer 62, the PSN increases by 1 every time a single sector is passed from the inner circumference side to the outer circumference side. The PSNs in the first and second layers at the same radial position are equal except for layer numbers. The LSNs are assigned only to sectors included in the user data area 5. In the first user data area 23, 0 is assigned as the LSN of the sector at the innermost circumference position, and the LSN increases by 1 every time a single sector is passed from the inner circumference side to the outer circumference side. In the second user data area 24, a value obtained by adding 1 to the maximum LSN of the first user data area 23 is assigned as the LSN of the sector at the innermost circumference position, and the LSN increases by 1 every time a single sector is passed from the inner circumference side to the outer circumference side.

It is clear from the comparison made between FIGS. 10 and 17, even if the recording/reproduction direction in a recording layer is different between the multi-layered information recording medium 50 of embodiment 1 and the multi-layered information recording medium 60 of embodiment 3, the relationship between assignment of LSNs and disposition of the spare areas is the same. Thus, as described in embodiment 1, even if user data has already been recorded in the user data area 5, the size of spare areas can be increased.

As described above, according to embodiment 3, for multi-layered information recording mediums having two or more recording layers, a common defect management method can be applied to both a multi-layered information recording medium wherein the recording/reproduction direction is the same in all of the recording layers and a multi-layered information recording medium wherein the recording/reproduction direction is alternately inverted for the respective recording layers. Thus, a defect sector can be replaced with a spare area of any recording layer, and therefore, the spare areas can be efficiently used. Furthermore, the size of the spare area can be increased so as to prevent lack of spare areas, whereby reliability of data can be improved.

Embodiment 4

Hereinafter, an embodiment of an information recording/reproducing apparatus, which performs recording/reproduction using the multi-layered information recording medium 50 described in embodiment 1, is described with reference to the drawings.

Figure 18:
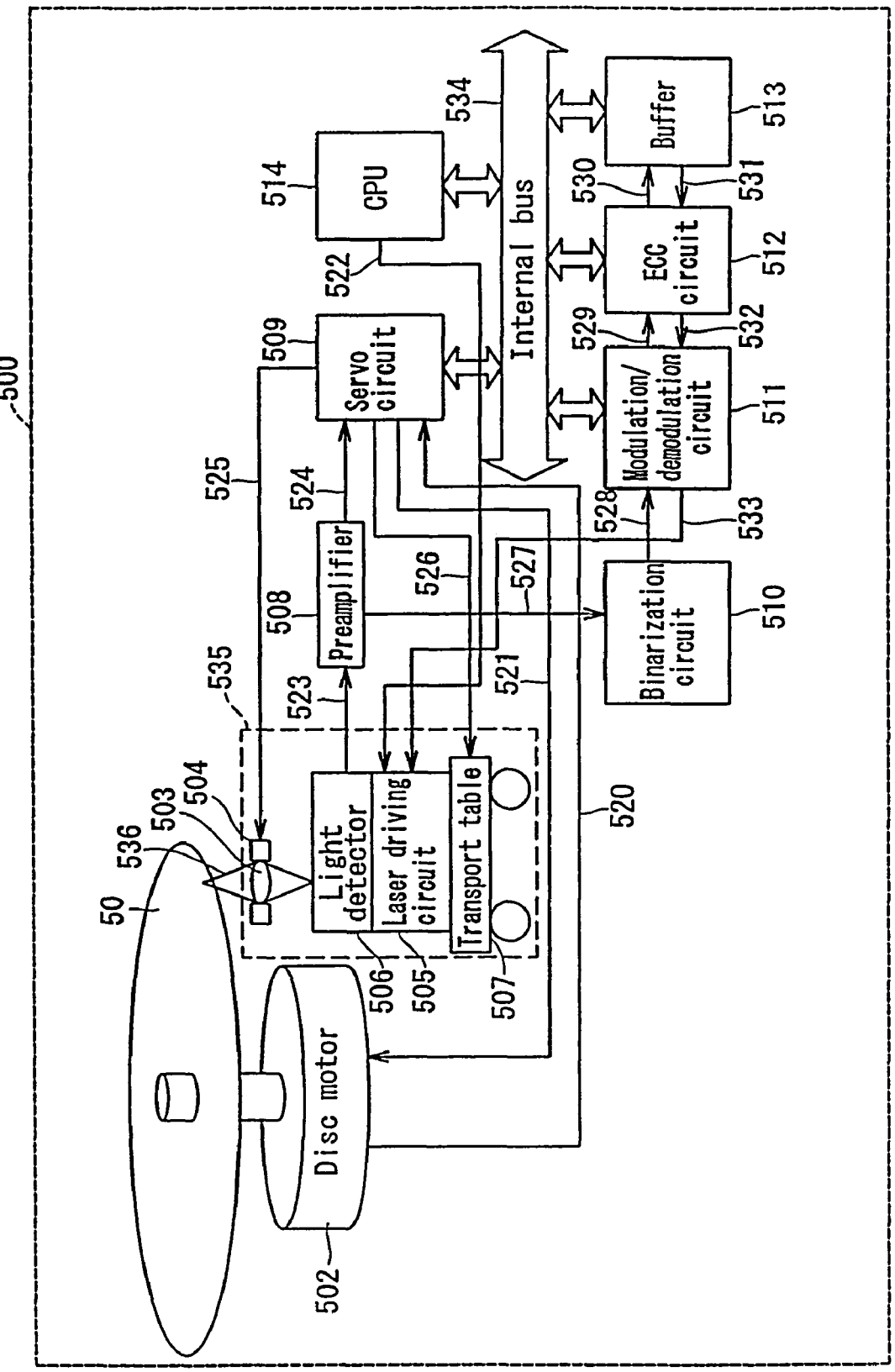
FIG. 18 shows an information recording/reproducing apparatus 500 according to embodiment 4 of the present invention.

FIG. 18 is a block diagram showing an information recording/reproducing apparatus 500 according to embodiment 4 of the present invention. The information recording/reproducing apparatus 500 includes a disc motor 502, a preamplifier 508, a servo circuit 509, a binarization circuit 510, a modulation/demodulation circuit 511, an ECC circuit 512, a buffer 513, a CPU 514, an internal bus 534, and an optical head section 535. In the information recording/reproducing apparatus 500, the multi-layered information recording medium 50 is inserted. The optical head section 535 includes a lens 503, an actuator 504, a laser driving circuit 505, a light detector 506, and a transport table 507. Reference numeral 520 denotes a rotation detection signal. Reference numeral 521 denotes a disc motor driving signal. Reference numeral 522 denotes a laser emission permitting signal. Reference numeral 523 denotes a light detection signal. Reference numeral 524 denotes a servo error signal. Reference numeral 525 denotes an actuator driving signal. Reference numeral 526 denotes a transport table driving signal. Reference numeral 527 denotes an analog data signal. Reference numeral 528 denotes a binarization data signal. Reference numeral 529 denotes a demodulation data signal. Reference numeral 530 denotes a correction data signal. Reference numeral 531 denotes a storage data signal. Reference numeral 532 denotes an encode data signal. Reference numeral 533 denotes a modulation data signal.

The CPU 514 functions as a control section. The CPU 514 controls the entire operation of the information recording/reproducing apparatus 500 via the internal bus 534 according to an incorporated control program. As described below, the optical head section 535 can optically write information in the multi-layered information recording medium 50 from one side of the multi-layered information recording medium 50. The optical head section 535 can optically read information from the multi-layered information recording medium 50. The CPU 514 controls execution of a defect management process using the optical head section 535 as described below.

In response to the laser emission permitting signal 522 output from the CPU 514, the laser driving circuit 505 emits laser light 536 onto the multi-layered information recording medium 50. The light reflected by the multi-layered information recording medium 50 is converted by the light detector 506 to the light detection signal 523. The light detection signal 523 is subjected to addition/subtraction in the preamplifier 508 so as to generate the servo error signal 524 and the analog data signal 527. The analog data signal 527 is A/D (analog/digital) converted by the binarization circuit 510 to the binarization data signal 528. The binarization data signal 528 is demodulated by the modulation/demodulation circuit 511 to generate the demodulation data signal 529. The demodulation data signal 529 is converted by the ECC circuit 512 to the correction data signal 530 which does not include any error. The correction data signal 530 is stored in a buffer 513. The servo circuit 509 outputs the actuator driving signal 525 based on the servo error signal 524, thereby feeding a servo error back to the actuator 504 for focusing control or tracking control of the lens 503. An error correction code is added by the ECC circuit 512 to the storage data signal 531 which is an output of data from the buffer 513, so as to generate the encode data signal 532. Then, the encode data signal 532 is modulated by the modulation/demodulation circuit 511 to generate the modulation data signal 533. The modulation data signal 533 is input to the laser driving circuit 505 so as to modulate the power of laser light.

The information recording/reproducing apparatus 500 may be used as a peripheral device of a computer, such as a CD-ROM drive or the like. In such a case, a host interface circuit (not shown) is additionally provided, and data is transmitted between a host computer (not shown) and the buffer 513 through a host interface bus (not shown) such as a SCSI or the like. Alternatively, if the information recording/reproducing apparatus 500 concomitantly works as a consumer device such as a CD player or the like, an AV decoder/encoder circuit (not shown) is additionally provided for compressing a moving image or sound or decompressing a compressed moving image or sound in order to transmit data between the host computer and the buffer 513.

In a reproduction operation of the information recording/reproducing apparatus 500 according to embodiment 4 of the present invention, it is necessary to provide two processes, a process of obtaining defect management information and a process of reproducing sectors while considering replacement, in order to reproduce information recorded in the multi-layered information recording medium 50 including two recording layers to which defect management of the present invention is applied.

In a recording operation of the information recording/reproducing apparatus 500 according to embodiment 4 of the present invention, it is necessary to provide, in addition to the above reproduction operation, two processes, a process of updating defect management information and a process of recording sectors while considering replacement, in order to record information in the multi-layered information recording medium 50 including two recording layers to which defect management of the present invention is applied.

Figure 19:
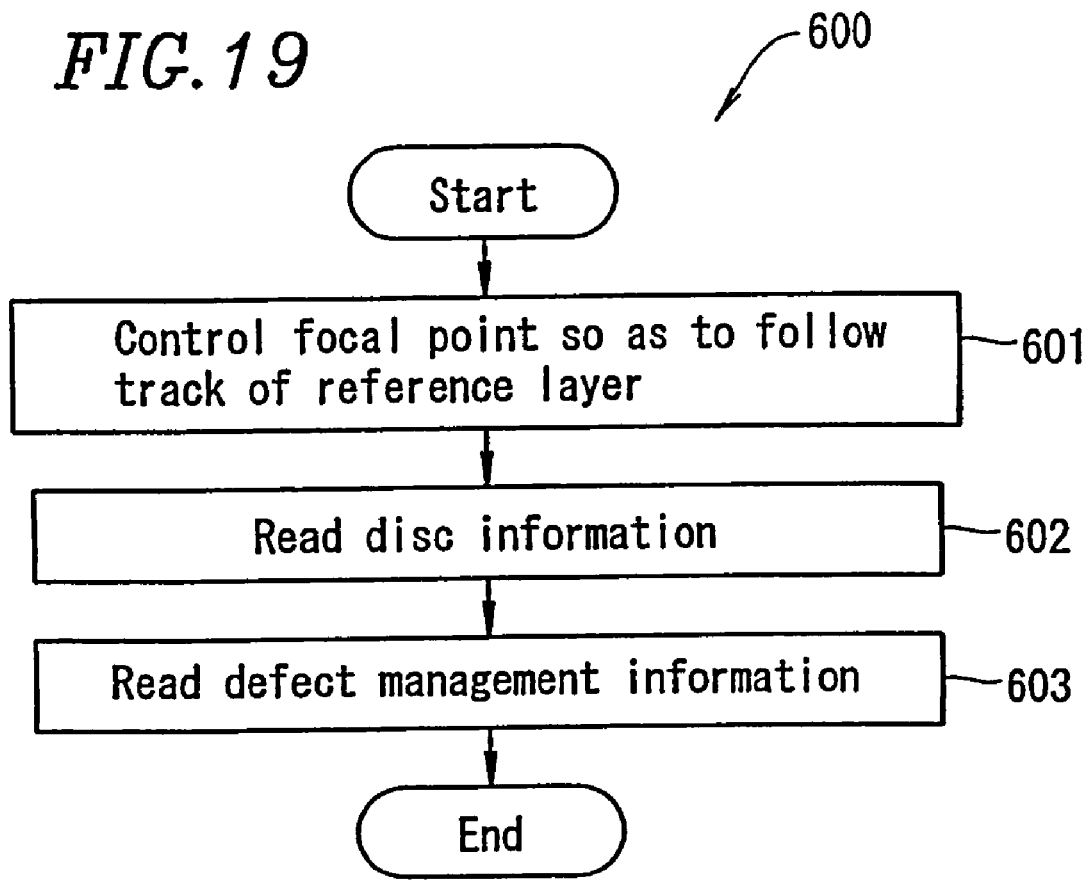
FIG. 19 is a flowchart for illustrating a procedure of obtaining defect management information according to embodiment 4 of the present invention.

FIG. 19 shows a flowchart 600 for illustrating a procedure of obtaining defect management information in embodiment 4 of the present invention. In this embodiment, the disc information zone 10, in which disc information is stored, and a defect management region 12, in which defect management information is stored, are provided in a reference layer.

At the first step of the process of obtaining defect management information, i.e., at step 601, the CPU 514 instructs the servo circuit 509 to control the focal point of laser light so as to follow a track of a reference layer.

At step 602, the optical head section 535 reproduces a sector which stores disc information, and the CPU 514 confirms parameters and formats which are necessary for recording/reproduction in the multi-layered information recording medium 50.

At step 603, the optical head section 535 reproduces a sector which stores defect management information. The reproduced data is retained in a predetermined place of the buffer 513.

Figure 20:
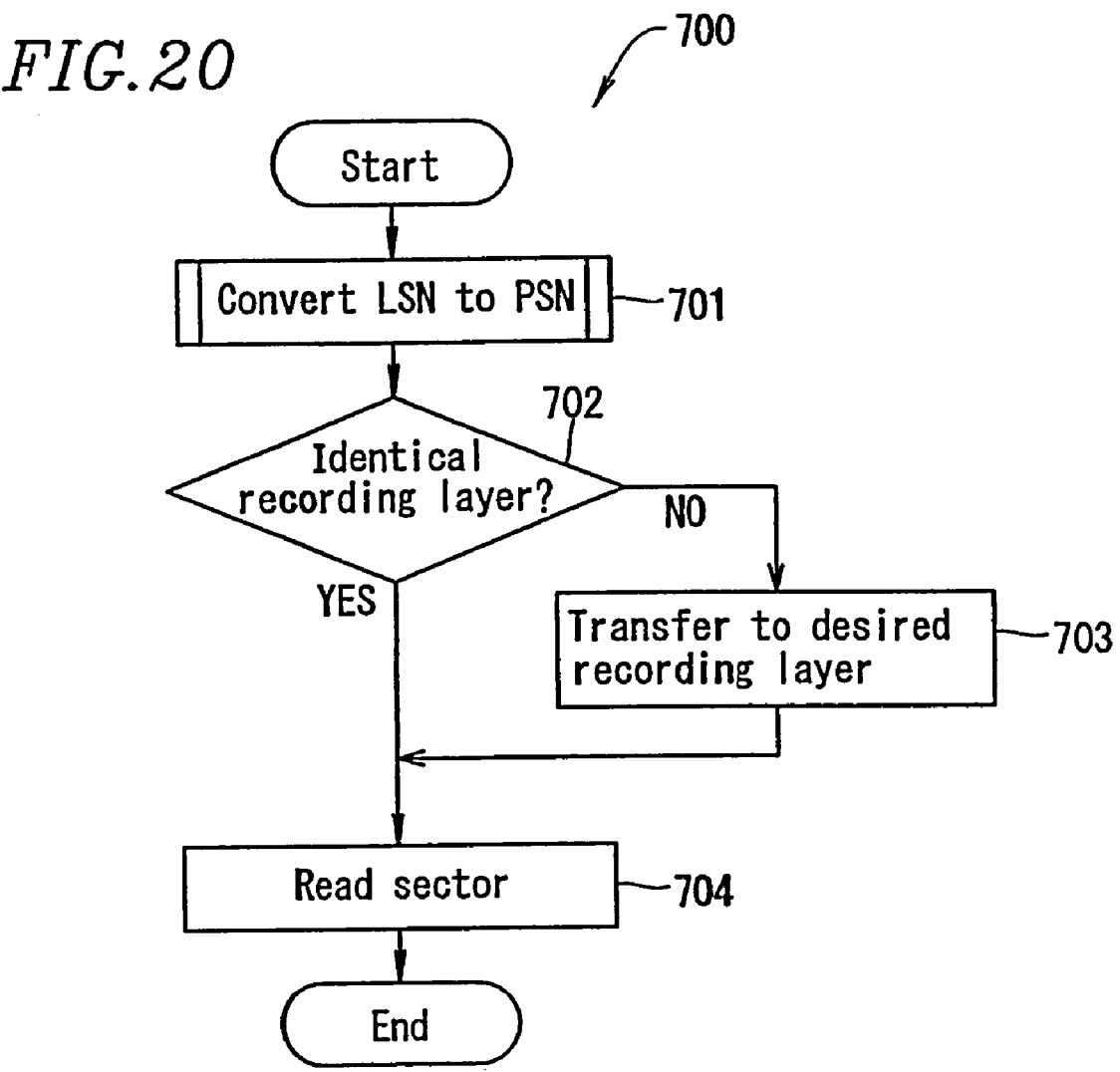
FIG. 20 is a flowchart for illustrating a reproduction procedure of sectors according to embodiment 4 of the present invention, wherein replacement is considered.

FIG. 20 is a flowchart 700 for illustrating a reproduction procedure of sectors according to embodiment 4 of the present invention, wherein replacement is considered. In this reproduction process, assume that defect management information including the DDS 20 and DL 21 have already been retained in the buffer 513.

At the first step of this reproduction process, i.e., at step 701, the CPU 514 converts the LSNs to PSNs (detailed descriptions of this step will be described later with reference to FIG. 21).

At step 702, the CPU 514 refers to the layer number of the PSN to determine whether or not a recording layer in which the focal point of the laser light 536 exists is identical to a recording layer to be reproduced. If identical, the process proceeds to step 704; if not, the process proceeds to step 703.

At step 703, the CPU 514 instructs the servo circuit 509 to let the focal point of the laser light 536 to follow a track of a recording layer to be reproduced.

At step 704, the optical head section 535 reproduces information recorded in a sector indicated by the PSN obtained at conversion step 701.

Figure 21:
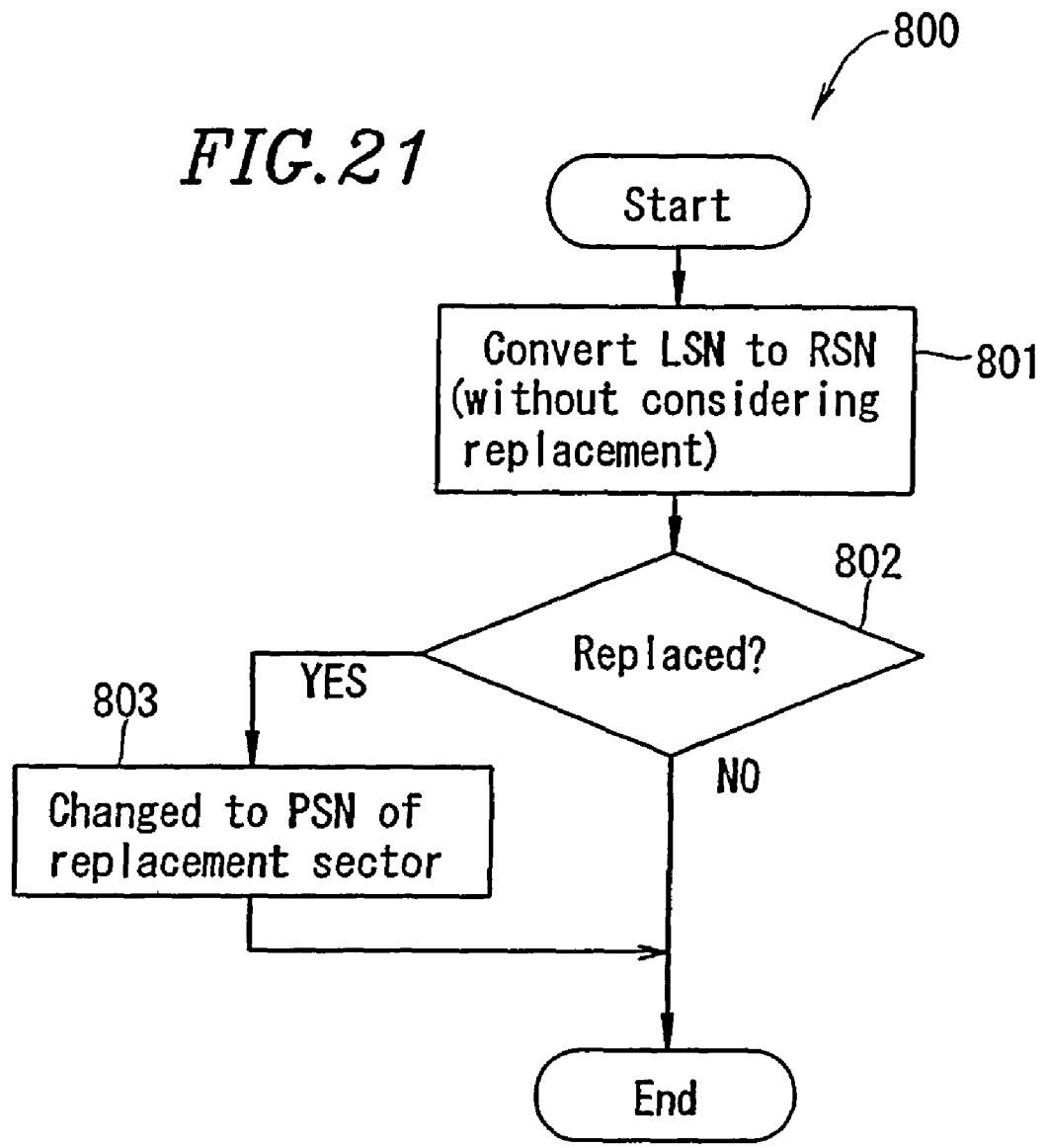
FIG. 21 is a flowchart for illustrating a procedure of converting LSNs to PSNs according to embodiment 4 of the present invention.

FIG. 21 is a flowchart 800 for illustrating a procedure of converting LSNs to PSNs (i.e., step 701 of FIG. 20) according to embodiment 4 of the present invention. In this embodiment, assume that in the first recording layer, the PSN increases by 1 every time one sector is passed from the inner circumference side to the outer circumference side, while in the second recording layer, the PSN increases by 1 every time one sector is passed from the outer circumference side to the inner circumference side.

At the first step of this replacement process, i.e., at step 801, the LSNs are converted to PSNs without considering a result of replacement of defect sectors indicated in the DL 21 with spare areas (i.e., in the same manner as that performed when no defect sector exists). Referring to FIG. 10, if an LSN to be converted is smaller than the total number of sectors included in the first user data area 15, a corresponding PSN is obtained by calculation of (the minimum PSN of the first user data area 15) plus (the LSN). If an LSN to be converted is greater than the total number of sectors included in the first user data area 15, a corresponding PSN is obtained by calculation of (the minimum PSN of the second user data area 16) plus (the LSN) minus (the total number of sectors included in the first user data area 15).

At step 802, the CPU 514 refers to the DL entries 303 of the DL 21 to determine whether or not a sector indicated by the above-calculated PSN has been replaced with a spare sector. If so, the process proceeds to step 803; if not, the replacement process ends.

At step 803, a replacement sector position of the DL entry 303, which indicates that the sector having the above PSN has been replaced, is employed as a PSN.

As described above, the information recording/reproducing apparatus 500 according to embodiment 4 of the present invention can reproduce information recorded in the multi-layered information recording medium 50 having two recording layers to which defect management of the present invention is applied. The reproduction operation of user data which is performed after the focal point of the laser light 536 has been moved to a recording layer to be accessed, is basically the same as the reproduction operation of user data performed for a single-layered information recording medium. Thus, it is clearly appreciated that any user data reproduction procedure for an information recording/reproducing apparatus designed for a single-layered disc can be used.

Figure 22:
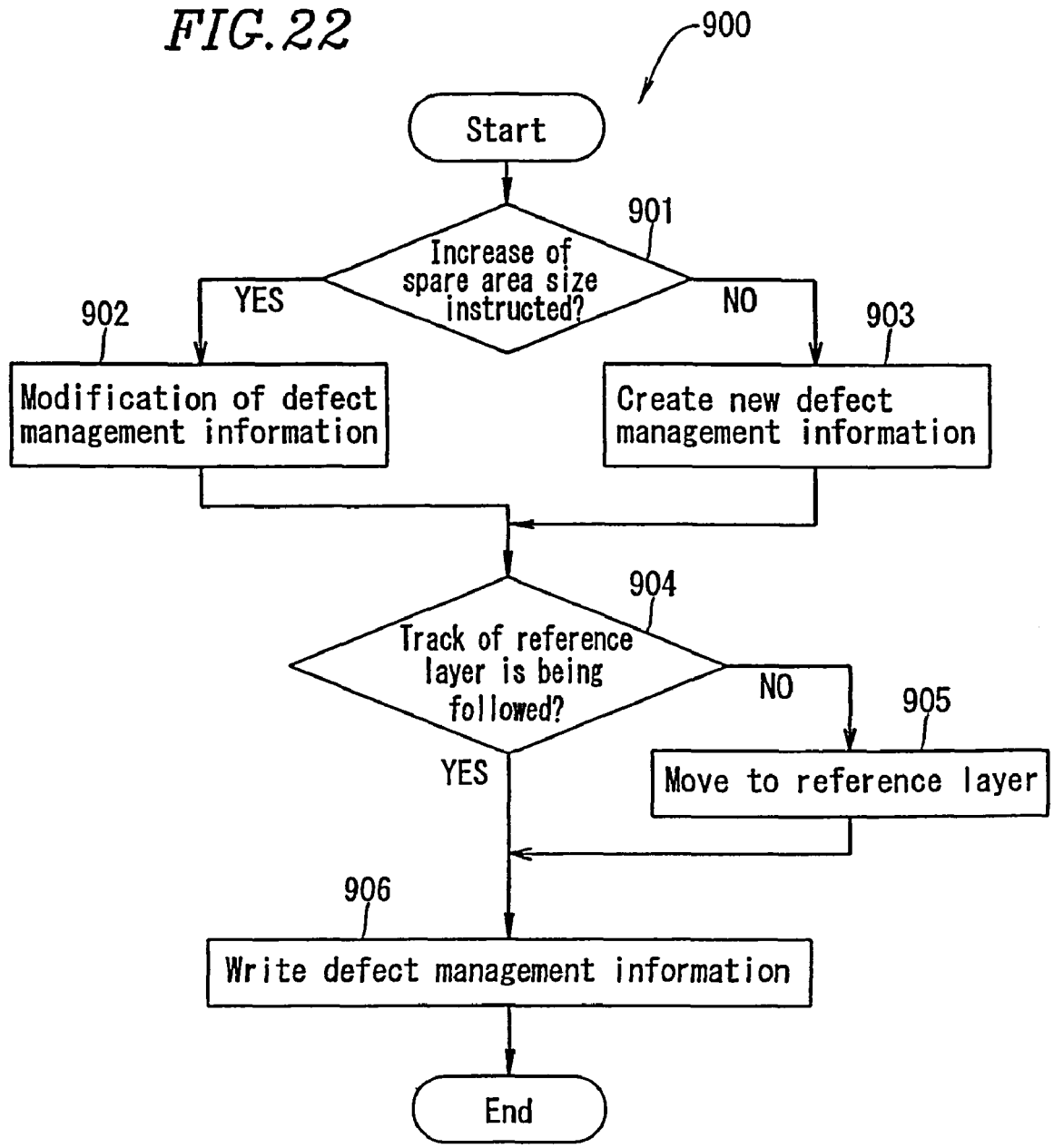
FIG. 22 is a flowchart for illustrating a procedure of updating defect management information according to embodiment 4 of the present invention.

FIG. 22 is a flowchart for illustrating a procedure of updating defect management information according to embodiment 4 of the present invention. In this embodiment, assume that a formatting process for the multi-layered information recording medium 50 includes an initialization process for defect management information and a process of increasing the size of a spare area.

At the first step of this updating process, i.e., at step 901, the CPU 514 determines whether or not a necessary formatting process is a process of increasing the size of a spare area. If so, the process proceeds to step 902; if not, the process proceeds to step 903.

At step 902, the CPU 514 sets a value of the end spare area size 205 of the DDS 20 (FIG. 7).

At step 903, the CPU 514 sets the respective values of the DDS 20 to predetermined values of the device, and sets the DL entry number 302 of the DL 21 to 0.

At step 904, the CPU 514 determines whether or not the focal point of the laser light 536 is following a track of a reference layer. If so, the process proceeds to step 906; if not, the process proceeds to step 905.

At step 905, the CPU 514 instructs the servo circuit 509 to let the focal point of the laser light 536 to follow the track of the reference layer.

At step 906, the optical head section 535 records defect management information, including the DDS 20 and DL 21, in a sector included in the defect management region 12.

Figure 23:
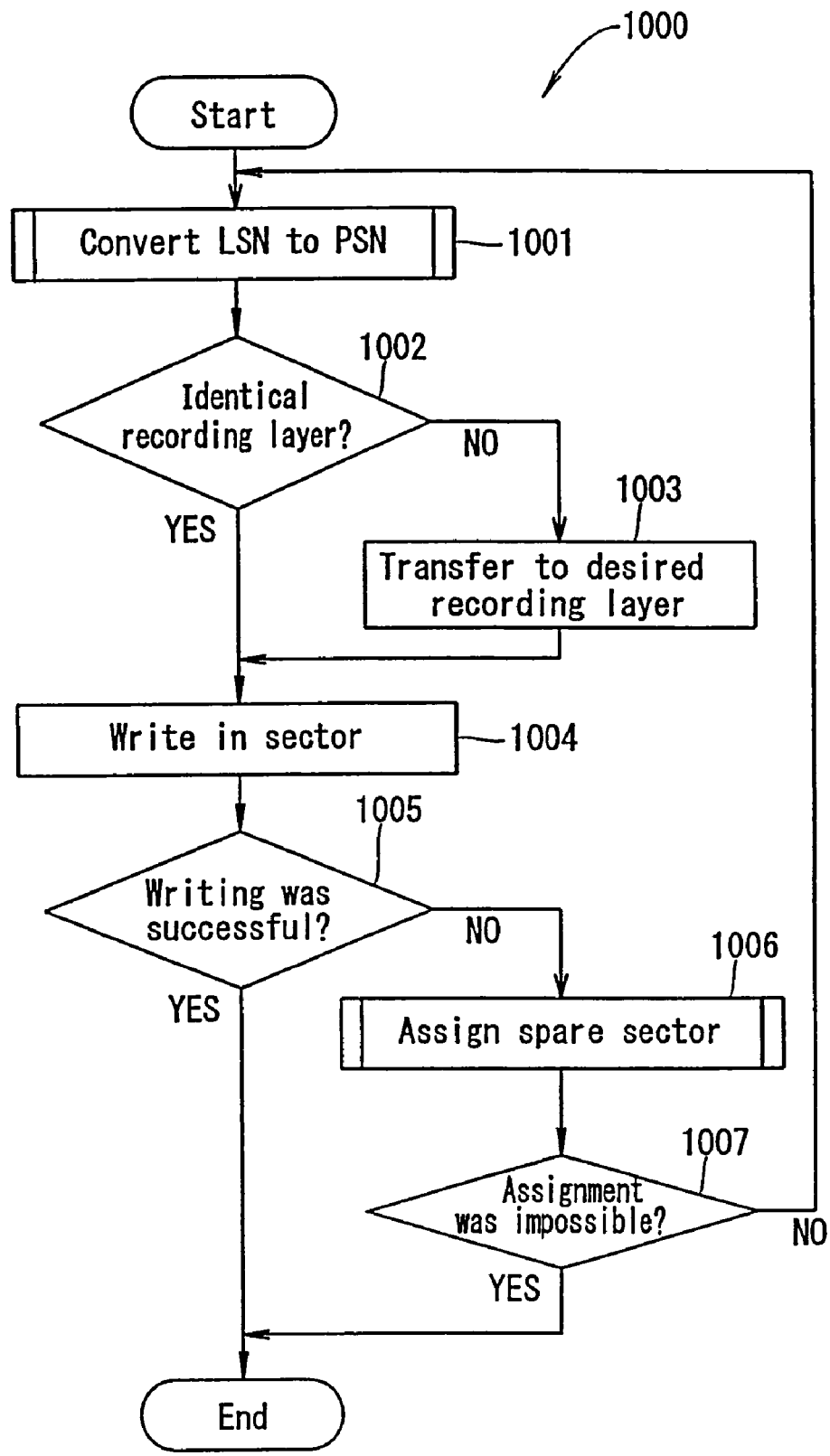
FIG. 23 is a flowchart for illustrating a recording procedure in sectors according to embodiment 4 of the present invention, wherein replacement is considered.

FIG. 23 is a flowchart 1000 for illustrating a recording procedure in sectors according to embodiment 4 of the present invention, wherein replacement is considered.

At the first step of this recording process, i.e., at step 1001, the CPU 514 converts the LSNs to the PSNs according to the procedure shown in FIG. 21.

At step 1002, the CPU 514 refers to the layer number of the PSN to determine whether or not a recording layer in which the focal point of the laser light 536 exists is identical to a recording layer in which information is to be recorded. If identical, the process proceeds to step 1004; if not, the process proceeds to step 1003.

At step 1003, the CPU 514 instructs the servo circuit 509 to let the focal point of the laser light 536 to follow a track of the recording layer in which information is to be recorded.

At step 1004, information is recorded in a sector indicated by the PSN obtained at conversion step 1001.

At step 1005, the CPU 514 controls the optical head section 535 to reproduce the information recorded in the sector, thereby determining whether or not recording of the information in the sector was successful (i.e., whether or not a defect sector exists in the user data area 5). If successful, the recording process ends; if not, the process proceeds to step 1006.

At step 1006, the CPU 514 assigns a spare sector to a defect sector, thereby replacing the defect sector with the spare sector (details of the process of assigning a spare sector will be described later with reference to FIGS. 24A and 24B).

At step 1007, it is determined whether or not the process of replacing the defect sector with the spare sector was impossible. If impossible, the recording process ends; if possible, the process returns to step 1001.

FIG. 24A is a flowchart for illustrating an assignment procedure of spare sectors according to embodiment 4 of the present invention.

The process of assigning spare sectors includes a process of finding at least one available spare area among a plurality of spare areas included in the multi-layered information recording medium 50, and a process of selecting, from the found at least one available spare area, a spare area which is closest to a defect sector. The details of the process of assigning spare sectors are described below with reference to FIG. 24A.

At the first step of the spare sector assignment process, i.e., at step 1101, the CPU 514 refers to the spare full flag group 208 (FIG. 8) to determine whether or not the multi-layered information recording medium 50 has an available spare area. If there is no available spare area, the CPU 514 determines that the assignment process is impossible and accordingly terminates the assignment process. If there is an available spare area, the process proceeds to step 1102.

At step 1102, the CPU 514 determines whether the radial position of a defect sector is closer to a spare area at the inner circumference side or closer to a spare area at the outer circumference side. If the radial position of the defect sector is closer to a spare area at the inner circumference side, the process proceeds to step 1103. If the radial position of the defect sector is closer to a spare area at the outer circumference side, the process proceeds to step 1104.

At step 1103, the CPU 514 refers to the spare full flag group 208 to determine whether or not the spare area at the inner circumference side is available. If available, the process proceeds to step 1105; if not, the process proceeds to step 1106.

At step 1104, the CPU 514 refers to the spare full flag group 208 to determine whether or not the spare area at the outer circumference side is available. If available, the process proceeds to step 1106; if not, the process proceeds to step 1105.

At step 1105, the CPU 514 refers to the spare full flag group 208 to determine whether or not a spare area which is in a recording layer where the defect sector exists, and which is at the inner circumference side, is available. If available, the process proceeds to step 1107; if not, the process proceeds to step 1108.

At step 1106, the CPU 514 refers to the spare full flag group 208 to determine whether or not a spare area which is in a recording layer where the defect sector exists, and which is at the outer circumference side, is available. If available, the process proceeds to step 1109; if not, the process proceeds to step 1110.

At step 1107, the CPU 514 assigns a spare sector included in the spare area which is in a recording layer where the defect sector exists, and which is at the inner circumference side, to the defect sector.

At step 1108, the CPU 514 assigns a spare sector included in a spare area which is in a recording layer different from the recording layer where the defect sector exists, and which is at the inner circumference side, to the defect sector.

At step 1109, the CPU 514 assigns a spare sector included in a spare area which is in a recording layer where the defect sector exists, and which is at the outer circumference side, to the defect sector.

At step 1110, the CPU 514 assigns a spare sector included in a spare area which is in a recording layer different from the recording layer where the defect sector exists, and which is at the outer circumference side, to the defect sector.

In the spare sector assignment procedure shown in FIG. 24A, a spare sector included in a spare area, whose radial distance from the defect sector is shortest, is used as a spare sector. If the radial distance is shorter, the time required for a seek operation, which is accompanied by a movement of the transport table 507, becomes shorter. According to the present invention, a different assignment procedure may be used so long as an objective of the present invention, i.e., using a spare sector whose radial distance from a defect sector is shortest as a spare sector, is attained.

Figure 24B:
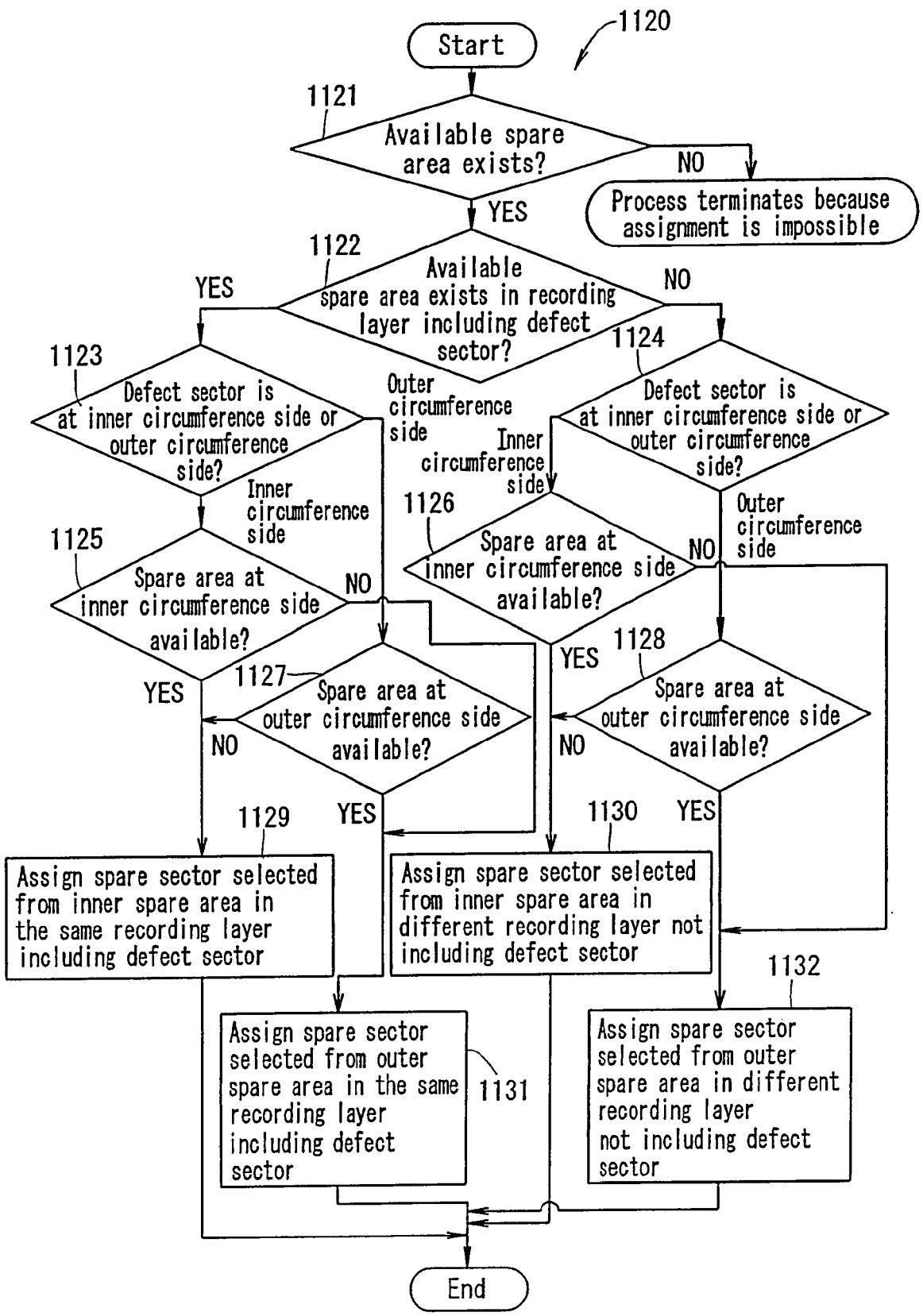
FIG. 24B shows a variation of the flowchart shown in FIG. 24A.

FIG. 24B shows a flowchart 1120 which illustrates an alternative spare sector assignment process according to embodiment 4 of the present invention.

This alternative assignment process includes the following processes: a process of finding at least one available spare area among a plurality of spare areas included in the multi-layered information recording medium 50; a process of determining whether or not at least one of the found available spare areas exists in a recording layer where a portion of the user data area 5 including a defect sector exists; and a process of selecting a spare area which is closest to the defect sector from the at least one found available spare area if it is determined that none of the at least one found spare area exists in the recording layer where the defect sector exists. The details of the process of assigning spare sectors are described below with reference to FIG. 24B.

At the first step of the spare sector assignment process, i.e., at step 1121, the CPU 514 refers to the spare full flag group 208 to determine whether or not the multi-layered information recording medium 50 has an available spare area. If there is no available spare area, the CPU 514 determines that the assignment process is impossible and accordingly terminates the assignment process. If there is an available spare area, the process proceeds to step 1122.

At step 1122, the CPU 514 refers to the spare full flag group 208 to determine whether or not a spare area included in a recording layer in which a defect sector exists is available. If available, the process proceeds to step 1123; if not, the process proceeds to step 1124.

At step 1123, the CPU 514 determines whether the radial position of a defect sector is closer to a spare area at the inner circumference side or closer to a spare area at the outer circumference side. If the radial position of the defect sector is closer to a spare area at the inner circumference side, the process proceeds to step 1125. If the radial position of the defect sector is closer to a spare area at the outer circumference side, the process proceeds to step 1127.

At step 1125, the CPU 514 refers to the spare full flag group 208 to determine whether or not a spare area residing at the inner circumference side of that recording layer is available. If available, the process proceeds to step 1129; if not, the process proceeds to step 1131.

At step 1127, the CPU 514 refers to the spare full flag group 208 to determine whether or not a spare area residing at the outer circumference side of that recording layer is available. If available, the process proceeds to step 1131; if not, the process proceeds to step 1129.

The processes of steps 1124, 1126, and 1128 are the same as those of steps 1123, 1125, and 1127, respectively, except that a recording layer including a spare area which is to be used is different from a recording layer including the defect sector.

At step 1129, the CPU 514 assigns a spare sector included in the spare area which is in a recording layer where the defect sector exists, and which is at the inner circumference side, to the defect sector.

At step 1130, the CPU 514 assigns a spare sector included in a spare area which is in a recording layer different from the recording layer where the defect sector exists, and which is at the inner circumference side, to the defect sector.

At step 1131, the CPU 514 assigns a spare sector included in a spare area which is in a recording layer where the defect sector exists, and which is at the outer circumference side, to the defect sector.

At step 1132, the CPU 514 assigns a spare sector included in a spare area which is in a recording layer different from the recording layer where the defect sector exists, and which is at the outer circumference side, to the defect sector.

The spare sector assignment procedure shown in FIG. 24B uses a spare sector in a spare area included in a recording layer in which a defect sector exists so long as such a spare sector is available. By using such a spare sector included in a recording layer in which a defect sector exists, it is not necessary to change different recording parameters for respective recording layers. For example, if in an information recording operation in a recording layer, the recording power is not optimally calibrated for the other recording layers, the assignment procedure shown in FIG. 24B can be performed faster than the assignment procedure shown in FIG. 24A. According to the present invention, a different assignment procedure may be used so long as an objective of the present invention, i.e., using a spare sector in a spare area included in a recording layer in which a defect sector exists so long as such a spare sector is available, is attained.

As described above, the information recording/reproducing apparatus 500 according to embodiment 4 of the present invention can record information in the multi-layered information recording medium 50 having two recording layers to which defect management of the present invention is applied. The information recording/reproducing apparatus 500 can assign a spare sector selected from a spare area included in a recording layer which is different from a recording layer in which a defect sector exists. The information recording/reproducing apparatus 500 can perform a process of assigning a spare sector while giving a greater weight to reduction of the seek time as described above with reference to FIG. 24A. Further, the information recording/reproducing apparatus 500 can perform a process of assigning a spare sector while giving a greater weight to reduction of the time required for setting the recording power as described above with reference to FIG. 24B. Herein, an operation performed after an optical head section reaches a recording layer to be accessed is basically the same as that performed on a single-layered information recording medium. Thus, it is clearly appreciated that any recording procedure arranged for an information recording/reproducing apparatus designed for a single-layered information recording medium can be used.

The recording operation in the user data area which is performed after the focal point of the laser light 536 has been moved to a recording layer to be accessed, is basically the same as the recording operation of user data performed for a single-layered information recording medium. Thus, it is clearly appreciated that any user data recording procedure for recording in a user data area, which is adapted for an information recording/reproducing apparatus designed for a single-layered disc, can be used.

Although the multi-layered information recording medium 50 described in embodiment 1 was used to explain embodiment 4 of the present invention, it is clearly appreciated that the multi-layered information recording medium 60 described in embodiment 3 can also be used. Further, it is also clearly appreciated that the multi-layered information recording medium 56 described in embodiment 2 can also be used when the conversion processing at step 801 shown in FIG. 21 is applied to three or more recording layers.

Although in the above descriptions of the present invention, reproduction/recording of information and defect management are performed on the units of a sector, it is clearly appreciated that the present invention is applicable even when reproduction/recording of information and defect management is performed on the units of a block which includes a plurality of sectors, or on the units of an ECC block which is, for example, a unit based on which an error correction code of a DVD disc is calculated. For example, in the case where the above operations are performed on the units of an ECC block, a plurality of sectors included in the ECC block in which a defect sector exists are replaced with a plurality of spare sectors, whereby the defect sector is replaced with a spare sector. Such a modified embodiment is made within the spirit and applicable range of the present invention, and any modified embodiment which is readily appreciated by those skilled in the art, falls within the scope of the claims of the present invention.

According to a multi-layered information recording medium of the present invention, one recording layer includes defect management information for all the recording layers. With such an arrangement, the defect management information for all the recording layers can be obtained by simply accessing the one recording layer. Thus, continuous accessibility can be improved.

According to a multi-layered information recording medium of the present invention, a first spare area which is positioned so as to be contiguous to a first user data area and a second spare area which is positioned so as to be contiguous to a second user data area are placed approximately at the same radial position on the multi-layered information recording medium. With this arrangement, when the focal position of laser light transits from the first user data area to the second user data area, the moving distance of an optical head section along the radial direction is ideally zero (0). Thus, continuous accessibility can be improved.

According to a multi-layered information recording medium of the present invention, a detected defect sector can be replaced with a spare area of any recording layer. Thus, spare areas can be efficiently used, and reliability of data can be improved.

According to a multi-layered information recording medium of the present invention, when the number of defect sectors is greater than what is expected, the defect sectors can be replaced with spare sectors by increasing the size of a spare area. Thus, reliability of data can be improved.

According to a multi-layered information recording medium of the present invention, consecutive numbers are assigned as LSNs to the user data areas throughout all the recording layers. With such an arrangement, a common defect management method can be applied to both a multi-layered information recording medium wherein the recording/reproduction direction is the same in all of the recording layers and a multi-layered information recording medium wherein the recording/reproduction direction is alternately inverted for the respective recording layers. Thus, the cost of production and development of the multi-layered information recording medium can be reduced.

According to a multi-layered information recording medium of the present invention, control information regions such as a region for storing recording/reproduction parameters, a region for storing defect management information, or the like, are provided in one recording layer. With such an arrangement, the control information for all the recording layers can be obtained by simply accessing the one recording layer. Thus, continuous accessibility can be improved.

According to a multi-layered information recording medium of the present invention, control information regions are provided in a reference layer. Thus, recording/reproduction operations can be performed in strict conformity with the information in the control information regions.

According to a multi-layered information recording medium of the present invention, every recording layer has its OPC region for calibrating the recording power. With such an arrangement, the recording power can be optimally calibrated for each recording layer.

According to an information reproduction method and information reproduction apparatus of the present invention, information can be reproduced from a multi-layered information recording medium which includes defect management information about a plurality of recording layers.

According to an information recording method and information recording apparatus of the present invention, information can be recorded in a multi-layered information recording medium which includes defect management information about a plurality of recording layers.

According to an information recording method and information recording apparatus of the present invention, a defect sector is replaced with a spare sector included in a spare area which is closer to the defect sector. With such an arrangement, assignment of a spare sector can be performed while giving a greater weight to reduction of the time required for seeking along the radial direction.

According to an information recording method and information recording apparatus of the present invention, a defect sector is replaced with a spare sector included in a spare area residing in a recording layer in which the defect sector exists. With such an arrangement, assignment of a spare sector can be performed while giving a greater weight to reduction of the time required for setting the recording power.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

The invention claimed is:

1. A multi-layered information recording medium including a plurality of recording layers, wherein the multi-layered information recording medium is configured in a manner such that information can be optically recorded from one side of the multi-layered information recording medium into each of the plurality of recording layers, the multi-layered information recording medium comprising:
   a user data area for recording user data; and
   a plurality of spare areas including at least one replacement region, wherein when the user data area includes at least one defect region, the at least one replacement region may be used in place of the at least one defect region,
   wherein the plurality of recording layers include a first recording layer and a second recording layer positioned contiguous to each other,
   a recording/reproduction direction of the first recording layer is opposite to a recording/reproduction direction of the second recording layer,
   the first recording layer includes a first user data area which is a portion of the user data area, and a first spare area which is one of the plurality of spare areas,
   the second recording layer includes a second user data area which is another portion of the user data area, and a second spare area which is another one of the plurality of spare areas,
   logical addresses are assigned to the first user data area along a circumference direction from an inner circumference side to an outer circumference side of the multi-layered information recording medium,
   logical addresses are assigned to the second user data area along a circumference direction from the outer circumference side to the inner circumference side of the multi-layered information recording medium,
   the logical addresses assigned to the first user data area and the logical addresses assigned to the second user data area are in series,
   the first spare area is positioned so as to be contiguous to the first user data area,
   the second spare area is positioned so as to be contiguous to the second user data area,
   the first spare area is positioned so as to be contiguous to a sector to which a maximum logical address is assigned among a plurality of sectors included in the first user data area,
   the second spare area is positioned so as to be contiguous to a sector to which a minimum logical address is assigned among a plurality of sectors included in the second user data area,
   the first spare area and the second spare area are positioned at the same radial position on the multi-layered information recording medium within the margins of a manufacturing error and a decentering,
   the user data area includes a plurality of sectors,
   logical addresses are assigned to the plurality of sectors,
   a third spare area which is one of the plurality of spare areas is positioned so as to be contiguous to a sector to which a maximum logical address is assigned among a plurality of sectors included in the second user data area, and
   the third spare area is expandable in a direction from the third spare area toward the second user data area, and a portion of the second user data is changed to a portion of the extended third spare area after the expansion.

2. A recording method for recording information in a multi-layered information recording medium of claim 1, the recording method comprising:
   replacing the defect region included in the first user data area with the replacement region included in the first or second spare area, and
   replacing the defect region included in the second user data area with the replacement region included in the first or second spare area.

3. A reproducing method for reproducing information from a multi-layered information recording medium of claim 1,
   wherein the multi-layered information recording medium further comprising a defect management area including information related to the plurality of spare areas, and
   the reproducing method comprising:
   reproducing user data based on the information related to the plurality of spare areas which is reproduced from the defect management area.

* * * * *